US008512182B2

(12) United States Patent
Tam

(10) Patent No.: US 8,512,182 B2
(45) Date of Patent: Aug. 20, 2013

(54) TORQUE-DRIVEN AUTOMATIC TRANSMISSION DEVICE FOR BICYCLE

(76) Inventor: Kwok Keung Tam, Hong Kong (HK)

(*) Notice: Subject to any disclaimer, the term of this patent is extended or adjusted under 35 U.S.C. 154(b) by 247 days.

(21) Appl. No.: 13/165,807

(22) Filed: Jun. 22, 2011

(65) Prior Publication Data

US 2012/0329589 A1 Dec. 27, 2012

(51) Int. Cl.
*F16H 63/00* (2006.01)
*F16H 9/00* (2006.01)
*F16H 59/00* (2006.01)
*F16H 61/00* (2006.01)

(52) U.S. Cl.
USPC ............................................. 474/80; 474/78

(58) Field of Classification Search
USPC ................................................ 474/78, 80
See application file for complete search history.

(56) References Cited

U.S. PATENT DOCUMENTS

| 3,071,984 | A | * | 1/1963 | Milenkovic | 192/217.4 |
| 3,769,848 | A | * | 11/1973 | McGuire | 474/70 |
| 3,830,521 | A | * | 8/1974 | Gardel et al. | 280/236 |
| 3,926,020 | A | * | 12/1975 | Dantowitz et al. | 474/11 |
| 4,571,219 | A | * | 2/1986 | Breden et al. | 474/70 |
| 4,598,920 | A | * | 7/1986 | Dutil et al. | 280/236 |
| 4,599,079 | A | * | 7/1986 | Chappell | 474/80 |
| 4,701,152 | A | * | 10/1987 | Dutil et al. | 474/70 |
| 4,713,042 | A | * | 12/1987 | Imhoff | 474/69 |
| 4,781,663 | A | * | 11/1988 | Reswick | 474/49 |
| 4,836,046 | A | * | 6/1989 | Chappel | 74/594.2 |
| 5,033,991 | A | * | 7/1991 | McLaren | 474/78 |
| 5,061,224 | A | * | 10/1991 | Stuhler | 474/84 |
| 5,163,881 | A | * | 11/1992 | Chattin | 474/78 |
| 5,295,916 | A | * | 3/1994 | Chattin | 474/78 |
| 5,445,567 | A | * | 8/1995 | Chattin | 474/78 |
| 5,681,234 | A | * | 10/1997 | Ethington | 474/70 |
| 6,012,999 | A | * | 1/2000 | Patterson | 474/80 |
| 6,158,294 | A | * | 12/2000 | Jung | 74/64 |
| 6,354,980 | B1 | * | 3/2002 | Grant | 475/266 |
| 7,059,618 | B2 | * | 6/2006 | Mallard | 280/216 |
| 7,892,129 | B2 | * | 2/2011 | Lee | 475/16 |
| 2004/0110601 | A1 | * | 6/2004 | Kojima et al. | 477/174 |
| 2007/0213150 | A1 | * | 9/2007 | Chattin et al. | 474/82 |

* cited by examiner

*Primary Examiner* — William A Rivera
*Assistant Examiner* — Henry Liu
(74) *Attorney, Agent, or Firm* — Ella Cheong Hong Kong; Sam T. Yip

(57) ABSTRACT

The present invention relates to a bicycle. In particular, it relates to bicycle with torque-driven automatic transmission. The automatic transmission device mainly includes a torque sensor, a body strength selector, a slope sensor, a front gearshift driving mechanism and a rear gearshift driving mechanism.

20 Claims, 25 Drawing Sheets

Section C-C

Section D-D

When torque is increasingly applied
(a)

When maximum torque is applied
(b)

Torque is diminishing or vanishes suddenly
(c)

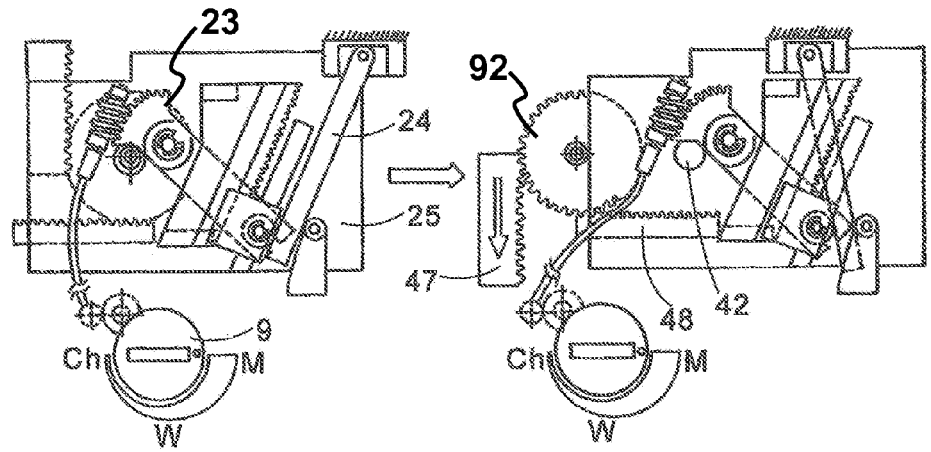
M is selected  FIG. 9(a)
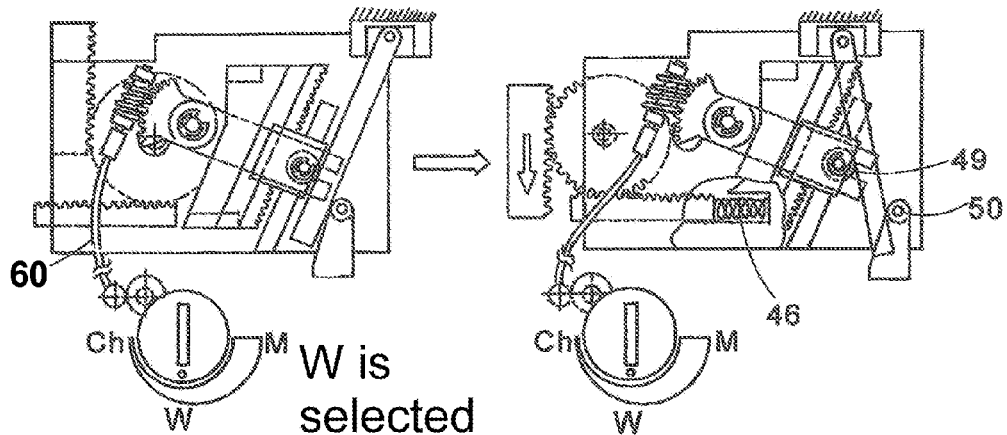
W is selected
FIG. 9(b)
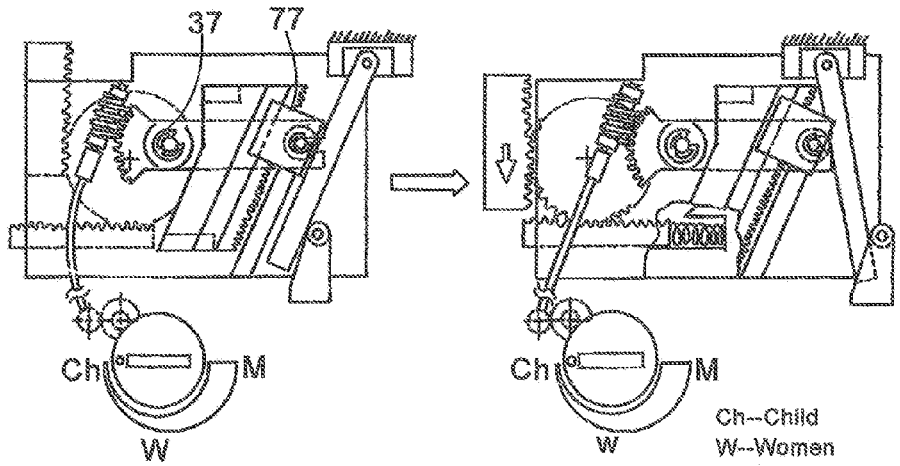
Ch is selected
FIG. 9(c)

Section F-F

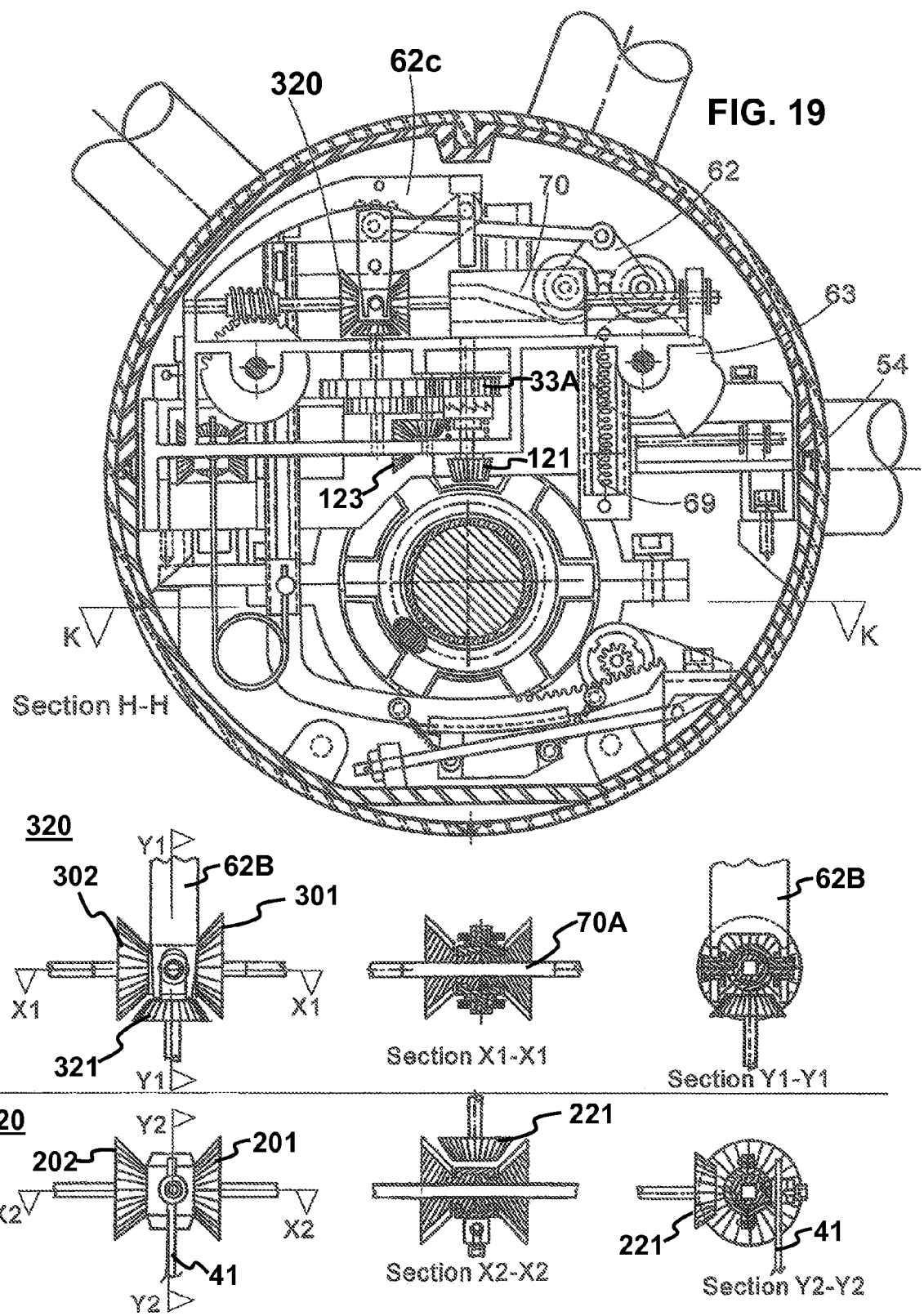

Section I-I

Section K-K

TORQUE-DRIVEN AUTOMATIC TRANSMISSION DEVICE FOR BICYCLE

TECHNICAL FIELD

The present invention relates to an automatic transmission system designed for a bicycle or a similar means of transportation. More particularly, this invention relates to an automatic transmission that can be integrated retrospectively onto a conventional, multi-speed sprocket assembly, and wherein the shifting of the gear is brought about by a change in the applied torque to the drive sprocket.

BACKGROUND

Automatic transmissions have now been implemented on automobiles for a number of decades. Their popularity is mainly due to the fact that with an automatic transmission the driver can pay more attention to the varying road conditions without the additional task of changing gears, and thereby improving the safety of the driver, the passengers and the other road users. By the same token, as cycling has become increasingly popular in recent years, there have been growing demands for automatic transmissions that can be used on bicycles.

In the prior art, a number of automatic bicycle transmissions can be found, and they can, in general, be divided into the three categories, namely fluid-drive, centrifugal-type and torque-responsive type.

The basic working principle of a fluid-drive transmission is to utilize the drag of a fluid contained within a chamber to transfer power. For example, in the fluid automatic bicycle transmission as disclosed in U.S. Pat. No. 7,059,618, a chamber is formed between an outer shell which is driven by an applied input torque (e.g. from the cyclist) and an inner shell which delivers output power to the rear wheel of the bicycle. Within the chamber, there contains a suitable fluid for power transfer between said outer and inner shells, and a mechanical vane stator assembly which, by changing the clearance between the vanes and the outer shell, can alter the drag within the fluid. The mechanical vane stator comprises a number of vanes which are each connected to a central stator via an individual spring or any elastic means. When the driving torque is increased, the outer shell, which is driven by the driving torque, applies through the fluid a larger force onto the vane stator assembly, and consequently the vanes are pushed towards the centre of the stator and away from the outer shell. As a result, a larger clearance between the vanes and the outer shell is being presented, and subsequently the slippage between the outer and inner shells is increased. This change in slippage is effectively a change in mechanical advantage between the input and output torque, and, in the situation described above, the change in mechanical advantage corresponds to a shift to a "lower gear" or a "downshift". A similar but reverse operation is performed when the input torque is reduced. A fluid-drive transmission system as described above has a number of drawbacks. Firstly, the transmission does not have a 'holding' function which maintains the drive ratio permanently or temporarily when the input torque is being varied. This is a desirable function in a number of circumstances, for example the cyclist may want to avoid an automatic upshift when his/her input torque is briefly removed during an uphill climb. The second drawback is that since the whole transmission assembly is filled with the transmission fluid, it might be quite troublesome if the transmission system needs to be dismantled for maintenance or repair. Another drawback of the above fluid-drive system is that the existing derailleur, sprockets and shifters on a conventional, manual-transmission bicycle will have to be removed before the installation of such system, and so it cannot be easily retrofitted onto a conventional bicycle.

Regarding the centrifugal-type automatic transmissions, the basic working principle is to implement the gear-shifting operation by harnessing the power from the rotational motion of the bicycle wheels. More specifically, a particular component of the system is caused to rotate at a speed proportional to that of the bicycle wheels. The centrifugal force that is created from such rotation will then directly or indirectly induce the movement of the gear-selecting component of the system, and subsequently lead to a change in the drive ratio. An example of a centrifugal-type automatic bicycle transmission is disclosed in U.S. patent application Ser. No. 11/670,570. In that patent application, a transmission system which comprises a rotatable shaft, a plurality of centrifugal weights pivotally connected to each other and to a star-shaped collar, a collar assembly that includes the above star-shaped collar and a rear derailleur is disclosed. The rotational motion of the bicycle wheels causes the centrifugal weights to rotate at a directly-proportional speed. As the rotational speed of the centrifugal weights increases, the increased centrifugal force would cause the centrifugal weights to flare outwardly by an increasing amount. As the centrifugal weights flare outwardly, the collar assembly is then forced to move along the rotatable shaft, and consequently the chain guide of the rear derailleur would move outwardly to derail the drive chain from a larger diameter sprocket to an adjacent smaller diameter sprocket, thereby resulting in an "upshift" to a higher gear as the speed of the bicycle increases. The collar assembly is biased such that the reverse of the above operations would occur as the speed of the bicycle decreases. A direct result of this design is that whenever the bicycle is at rest, the largest diameter sprocket (i.e. the lowest gear) will be automatically selected. This is an undesirable feature because when a low gear is selected a high pedaling cadence is needed to accelerate the bicycle. However, the design of the centrifugal-type transmission is such that upshifting will not occur unless a certain travelling speed is attained, and therefore it may actually be more tiring to cycle with such centrifugal-type automatic transmission than with a conventional manual transmission. Furthermore, the installation of this centrifugal-type transmission requires modifications to the existing rear sprocket assembly, and so it could be a difficult operation to retrofit such system onto a conventional bicycle.

A third type of automatic bicycle transmission is the torque-responsive design, and an example of which is disclosed in U.S. Pat. No. 5,061,224. The transmission system that is disclosed therein comprises a variable-pitch pulley consisting of two opposite-side, slidable sheave members and a V-belt which connects the variable-pitch pulley to a driven pulley. The variable-pitch pulley is sensitive to the torque applied by the cyclist to the bicycle pedal. As the applied torque increases, the distance between the variable-pitch pulley and the driven pulley extends, and so the V-belt is forced to move inwards towards the middle of the two sheave members where the radius of curvature is smaller. As a result, a reduced-diameter drive pulley is now driving the driven pulley, and therefore, a "downshift" has been effectively performed. A major drawback of this invention is that whenever the applied torque is removed, for example during coasting, the gear ratio will immediately return to a "low torque, high speed" configuration. This can cause inconvenience to the cyclist especially when he/she wishes to take a brief rest to conserve energy while cycling up an incline.

Another torque-responsive automatic bicycle transmission which addresses the above problem is disclosed in U.S. Pat. No. 4,781,663. An embodiment of that invention comprises a drive pulley and a driven pulley connected via a V-belt. Both the drive pulley and the driven pulley are made up of a plurality of retractable arms such that the effective diameters of the pulleys can be varied by the expansion or retraction of those arms. Upon application of an increased torque, the tension within the V-belt will cause, via a number of components, the drive pulley arms to retract to form a reduced-diameter pulley. Meanwhile, the tension within the belt will ensure that the arms of the driven pulley shall expand accordingly. As a result, the gear ratio is adjusted to provide a higher output torque. When the input torque is reduced, the drive pulley and the driven pulley will expand and contract respectively using the same mechanism as described above. This invention further includes a "hold system" which prevents the gear ratio from changing even when the applied input torque has exceeded or reduced to a level at which the gear ratio would normally change. This holding function is accomplished by applying an axial force to the opposite surfaces of the pulley arms to hold them in their respective position through frictional engagement of the opposite arm surfaces and two side cam plates. This holding function is desirable, but to perform such function purely by frictional engagement may not be the best method since the applied torque could be large enough to overcome the "holding" friction. Moreover, wear and tear may occur as a result of any slippage between the frictionally-engaged arm surfaces and the side cams, and so the effectiveness of the hold system may deteriorate after a certain period of use. Furthermore, the hold system would only operate if it has been manually activated by the cyclist.

A third example of a torque-responsive type automatic bicycle transmission is disclosed in U.S. Pat. No. 3,769,848. A preferred embodiment of the disclosed invention comprises a heavily modified rear sprocket assembly slidably installed onto a rear axle designed to replace that on a conventional bicycle. The rear axle comprises a shaft on which a spiral track and a number of recesses, formed parallel to the track, are provided around its periphery. Installed onto the axle alongside the rear sprocket assembly is a free-wheeling circular member which contains two hardened balls. One of them is to be received by the track while the other is to be received by one of the recesses, exactly which depends on the rear sprocket that is being selected. When the input torque is increased, the circular member would rotate relative to the shaft, and consequently one of the hardened balls would travel along the spiral track, simultaneously forcing the other hardened ball to move from one recess to the next closest one and thereby displacing the rear sprocket assembly along the rear axle such that the next largest rear sprocket will be engaged via a conventional bicycle derailleur. When the input torque is reduced, a spring provided on the rear axle would urge the rear sprocket assembly, through the ball-and-track mechanism, to move in the direction such that the next smallest rear sprocket is engaged. Several additional features have also been disclosed that may be incorporated into the previously described embodiment. The first of which is a dash-pot contained within the shaft for preventing undesired shifting in response to momentary changes in the applied torque. Another additional feature is a locking mechanism consisting of a locking plate and a set of grooves formed on an enlarged portion of the shaft, together they prevent any movement of the rear sprocket assembly relative to the axle and thereby inhibiting any change in the rear gear ratio even when the applied torque is being varied. A third additional feature that was disclosed is a simplified locking mechanism comprising a detent and a receiving slot. If the automatic shifting function is to be deactivated, the detent can be switched to an operative position at which the rear sprocket assembly will be inhibited from moving along the axle, and hence deactivating the automatic shifting function. To reactivate the automatic shifting function, the detent can be switched back to its original position. A drawback with this driving mechanism is that it does not allow the automatic shifting function to be only temporarily deactivated, i.e. the mechanism can only be activated when the smallest diameter sprocket is being selected. Moreover, another drawback of this invention is that its installation requires a large amount of modifications to be made to a conventional bicycle.

In addition, all of the above prior art inventions would only adjust the gear or gear ratio of the rear sprocket assembly while that of the front sprocket assembly will remain unchanged. However, if the gear of the front sprocket assembly can also be shifted, the change in the mechanical advantage of the whole transmission system can be carried out more effectively and the system can also be utilized to a greater extent. Furthermore, all of the above "hold" systems would have to be activated manually, which would present an extra distraction to the cyclist.

Therefore, there is a need in the prior art for an automatic bicycle transmission by which the gears of both the front and rear sprocket assemblies can be shifted. It is highly desirable that such transmission system can automatically "hold" any selected gear ratio even when the applied input torque is being varied, and such hold system should be durable. Furthermore, the transmission system should automatically select the highest gear when starting from rest, or at least the cyclist should be able to maintain a comfortable pedaling cadence at all speeds. Additionally, it should be easy to retrofit the automatic transmission system onto a conventional bicycle, as well as to maintain and repair it afterwards.

SUMMARY OF THE INVENTION

The present invention is an automatic transmission system for use in a bicycle that includes five major components, including a torque sensor, a body strength selector, a slope sensor, a front gearshift driving mechanism and a rear gearshift driving mechanism. With the automatic transmission system as disclosed herewith, a selected gear ratio can be maintained when the bicycle is in motion or comes to a stop, especially even if the cyclist fails to keep stepping on the pedals. This holding function is more preferable because not only it is automatic but the selected gear ratio is also held mechanically by a gear blocker which is less susceptible to the issue of wearing. Furthermore, the automatic transmission system provided herewith can be easily installed onto a bicycle which is commonly available in the market. Neither redesign nor modification of bicycle is required under the arrangement in the present invention. It is convenient to perform repair and maintenance on the automatic transmission system because the automatic transmission system can be easily assembled and dissembled.

The torque sensor consists of an input shaft which has a threaded section in the middle part, and connects the two pedals on the opposite sides of the bicycle. It also includes a coil spring which surrounds the threaded middle section and a torque variation output ring which is attached to one end of the coil spring and moves in accordance with the compression or expansion of the coil spring. As the torque applied to the input shaft is increased, such as during a period of uphill climbing, the coil spring will be urged to compress as a result of the increasing force. The compression of the coil spring causes the torque variation output ring to move accordingly, and the movement of the torque variation output ring would then induce a series of subsequent actions within the transmission system.

The movement of the torque variation output ring causes the pushing rack to move in the same direction as the torque variation output ring, and, via a number of force-transmission members such as various gears, a receiving rack, a push arm, a swing arm, a tackle and a receiving shaft, the movement of the pushing rack then puts the gear-blocker into operation. The gear-blocker includes a slope sensor which prevents the gear from shifting during a brief period of torque loss while the cyclist is going up a slope. When the gear-blocker enters into operation, the rear gearshift driving mechanism will be concurrently activated. In particular, as the receiving shaft is being pushed by the swing arm, a cam, which has three different effective radii along its circumference, within the rear gearshift driving mechanism will rotate accordingly. If, as a result of an increase in the input torque, the cam has rotated through a sufficiently large angular displacement such that a portion of the cam with a larger effective radius is now engaged, the front gearshift driving mechanism will then also start to operate. Focusing on the rear gearshift driving mechanism, the rotation of the cam will, via several gears, be translated into a corresponding rotation of the controlling disc of the rear sprocket assembly. If the increase in torque is of sufficient magnitude, the controlling disc would then cause the derailleur of the bicycle to select the next largest rear sprocket. Regarding the front gearshift driving mechanism, once the front gearshift driving mechanism enters into operation, the controlling disc of the front sprocket assembly would then rotate accordingly. In a similar fashion to the rear controlling disc, if the increase in torque is sufficiently large, the front controlling disc would cause the front sprocket derailleur to select the next smallest front sprocket.

The body strength selector allows the user to select an automatic transmission which fits his or her own strength. For example, if the user is a little child, he may not be strong enough to climb uphill on a gently inclining slope without changing to the lowest gear. In addition, the maximum force or torque a user can exert on cycling varies with his or her body characteristics such as age, sex and weight. One of the advantages of the present invention is that the body strength selector can change gears at a preferred rate in response to the torque applied by the user. Therefore, all the user needs to do is to choose the right profile he or she belongs to, for example, namely child or female adult or male adult, which has been taken in account of various parameters such as age, sex and weight for each profile. For example, a larger torque is required for every change to a lower gear if the male profile is selected. A smaller torque is required for every change to a lower gear if the child profile is selected.

One aspect of the present invention is on the front/rear gearshift driving mechanisms which controls the front sprocket assembly and rear sprocket assembly at different level of the slope. The front/rear gearshift driving mechanisms includes a ramp, a front/rear directional change gear assembly, a balancing swing weight, a cam and other connecting parts with the front and rear sprocket assemblies. The driving mechanism of the present invention senses the change of the torque along the slope and the adjustment associated with other parts of the present invention so as to initiate the switching of the sprockets with different sizes at the front sprocket assembly and the change of the hub diameters of the rear sprocket assembly in order to the bicycle constantly moves along the slope. The front/rear gearshift driving mechanisms also include an anti-reverse device connected to the pedal to avoid the reverse rotation of the pedal wheel when the torque is decreasing and/or the cyclist misses the step on the pedal.

An automatic transmission device for use in a bicycle includes a housing; a torque sensor configured to detect a torque generated by a pedal on the axle of the bicycle; a body strength selector having a plurality of settings configured to vary the rate of change of gear; a slope sensor disposed within the housing, the slope sensor having a weight at a lower end thereof to maintain the position thereof corresponding to the inclination of the housing changing according to the slope on which the housing is disposed on; a front and rear gearshift driving mechanism configured to control a front sprocket assembly and a rear sprocket assembly.

The torque sensor is configured to displace a torque variation output ring to control the movement of a tackle. The tackle includes a push arm configured to arrange a pushing shaft at a plurality of orientations controlling the magnitude of the moment of a swing arm such that a receiving shaft is configured to change gear at various rates by rotating a disc for controlling a front sprocket assembly and a disc for controlling a rear sprocket assembly respectively. The slope sensor is configured to such that a catch prevents a rack block from performing any change of gear when the slope value is positive. The front and rear gearshift driving mechanism is configured to drive the rotation of the front sprocket assembly through a cam, a balancing swing weight and a gear assembly of bevel gears.

The automatic transmission device further includes an air-damping chamber is arranged within the torque sensor such that the motion of the axle is dampened when the torque on the pedal is reduced to zero. The automatic transmission device further includes an upper gear fixing block is disposed at the upper end of the pushing shaft and a lower gear fixing block is disposed at the lower end of the pushing shaft such that the displacement of the pushing shaft is confined by the upper gear fixing block and the lower gear fixing block. The automatic transmission device further includes a handle configured to hold a chain such that a guide board is displaced to the position of the smallest gear to provide more space for rearranging the chain.

The automatic transmission device further contains a weight attached to a weight crane of the slope sensor. Furthermore, the automatic transmission device comprises a release separating the lower part of a weight crane from the upper part of a weight crane. The automatic transmission device also includes a cover to seal the housing with dust batten such that entry of foreign material into the housing is prevented. The housing is fitted into a frame together with the cover such that a slot on the cover engages with a guide on the inner wall of the frame to secure the position of the housing in the frame.

The automatic transmission device for use in bicycle further includes an anti-reverse device is configured to prevent the reverse rotation of the pedal when the torque applied on the axle diminishes. The cam is configured to have its orientation balanced by a balancing swing weight such that the cam has a plurality of portions with different radius fitted with the balancing swing weight.

The balancing swing weight is arranged at a plurality of levels to fit with different portions of the cam by moving along a ramp. The lower part of the weight crane is configured to be engaged with a damper such that the motion of the weight crane is provided with a damping effect.

The gear assembly is configured to have both a first bevel gear and a second bevel gear rotating in the same direction such that the first bevel gear and the second bevel gear engage with different ends of a third bevel gear respectively at different time to turn the third bevel gear in different directions. The third bevel gear is connected to an inertia flywheel such that the inertia flywheel turns the third bevel gear for further rotation after the third bevel gear is no longer engaged with either the first bevel gear or the second bevel gear.

The torque sensor has a threaded portion screwing through a piston and a coil spring to sense the torque variation. The piston has a plurality of holes through which a lubricant is applied onto the threaded portion to maintain the sensitivity of the torque sensor.

Other aspects of the present invention are also disclosed as illustrated by the following embodiments.

BRIEF DESCRIPTION OF THE DRAWINGS

These and other objects, aspects and embodiments of the present invention will be described hereinafter in more details with reference to the following drawings, in which:

FIG. 9 depicts the working mechanism of the body strength selector of an automatic transmission device according to one embodiment of the present invention when various profiles are selected: (a) Male is selected; (b) Female is selected; (c) Child is selected.

FIG. 19 depicts a cross-sectional view of the automatic transmission device along the H-H axis in FIG. 3.

FIG. 20 depicts multiple views and cross-sectional views of a gear assembly of bevel gears.

DETAILED DESCRIPTION

Figure 1:
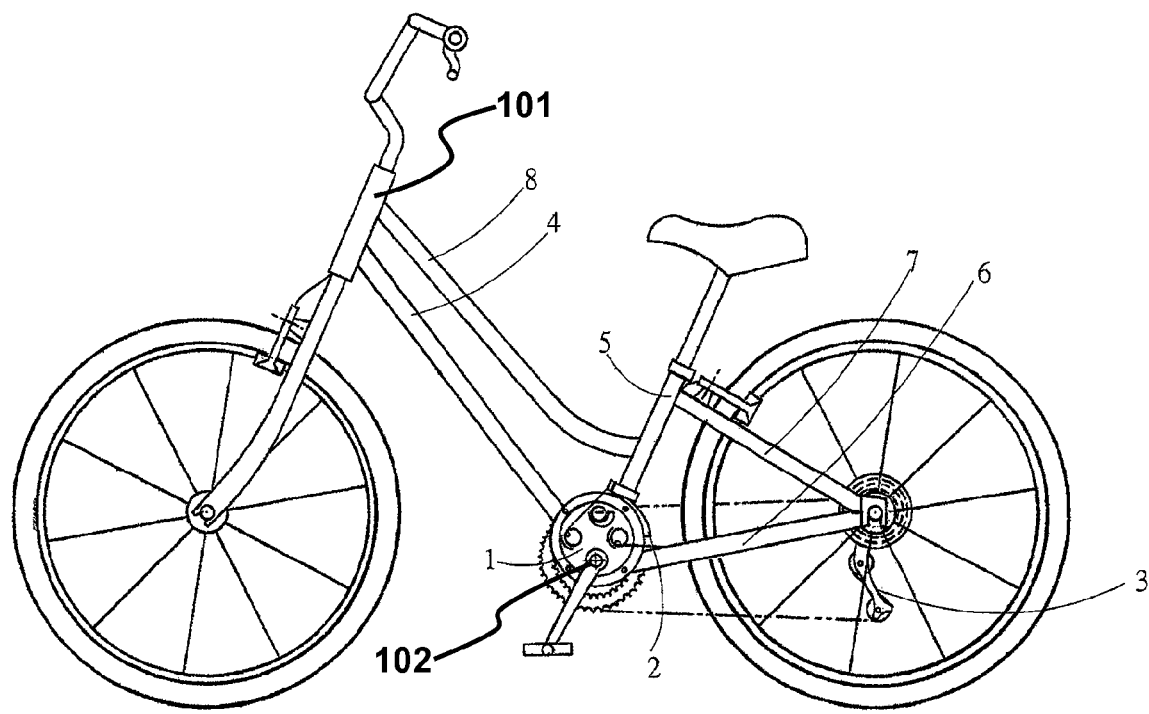
FIG. 1 depicts a side elevation view of a generic bicycle equipped with an automatic transmission device according to one embodiment of the present invention.

FIG. 1 depicts a side elevation view of a generic bicycle equipped with an automatic transmission device according to one embodiment of the present invention. The bicycle includes a number of components, for example, a head tube 101, a seat tube 5, a cross bar 8, a down tube 4, a seat stay 7, a chain stay 6, a rear derailleur 3 and a front derailleur 2. The bicycle is also equipped with an automatic transmission device 1. The cross bar 8 and the down tube 4 extend from the seat tube 5 to the head tube 101. The chain stay 6 and the seat stay 7 extend from the seat tube 5 to the rear wheel axle. In one embodiment, each crank has a pedal at one end and connects with an axle at the other end. The axle 102 is arranged at the lower end of the seat tube 5 where the down tube 4 and the chain stay 6 join with the lower end of the seat tube 5. The automatic transmission device 1 is installed at the lower end of the seat tube 5 with the axle 102 crossing through the automatic transmission device 1. The automatic transmission device 1 controls the front derailleur 2 and the rear derailleur 3.

Figure 2:
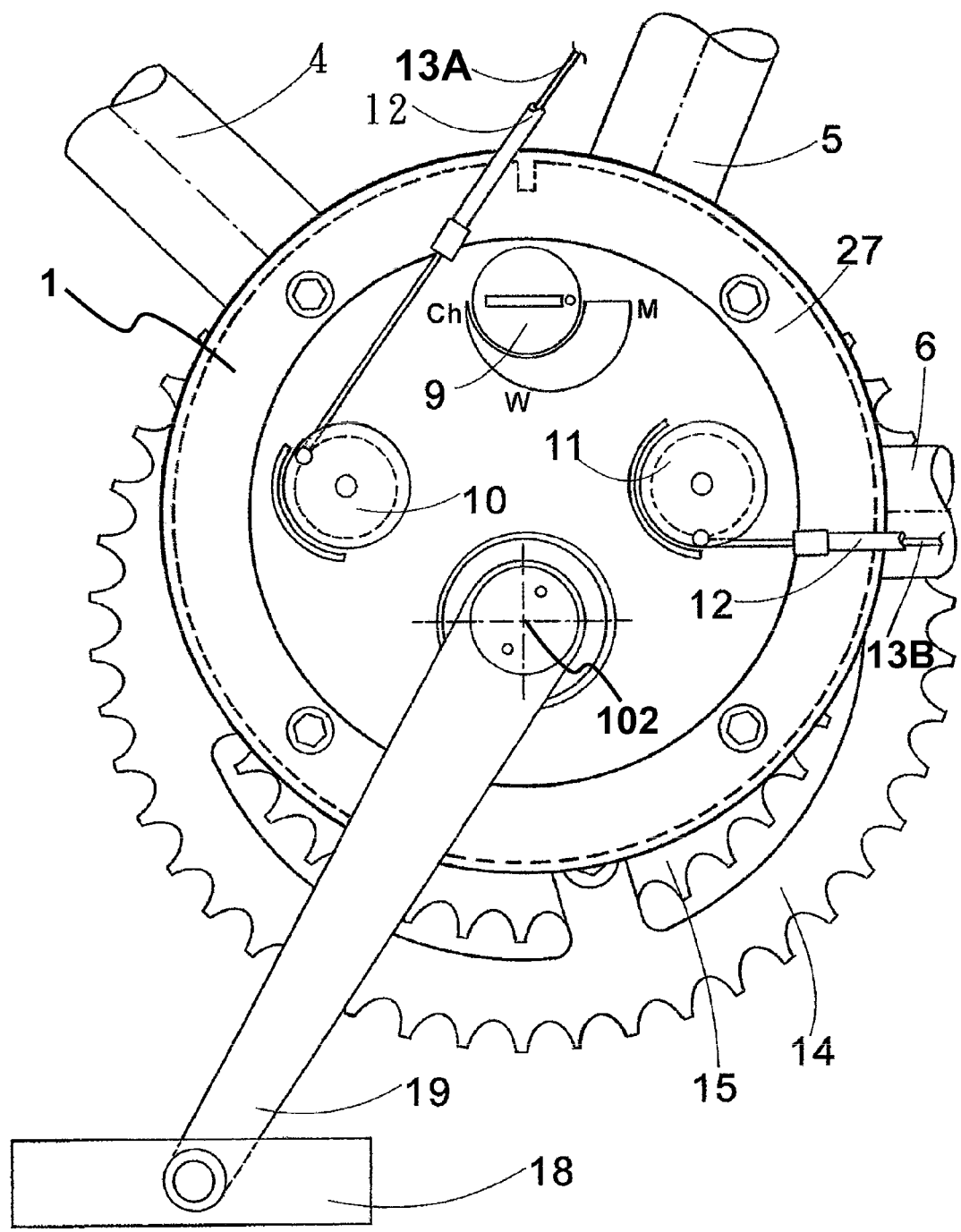
FIG. 2 depicts a panel of an automatic transmission device according to one embodiment of the present invention.

FIG. 2 depicts a panel of an automatic transmission device according to one embodiment of the present invention. One the panel of the automatic transmission device 1, there is a body strength selector 9 which is rotatable by a flat disc such as coin after fitting the flat disc into a recess on the body strength selector 9. The panel has an opening to allow the axle 102 to fit through. The axle 102 is connected to the pedal 18 through the crank 19. The automatic transmission device 1 is secured onto a frame 27 which is supported by the down tube 4, the chain stay 6 and the seat tube 5 in order to be secured on the bicycle. The front derailleur (not shown) is controlled by the automatic transmission device 1 through a first wire 13A. The rear derailleur (not shown) is controlled by the automatic transmission device 1 through a second wire 13B. Both the first wire 13A and the second wire 13B are covered with a sheath 12. The sheath 12 can be made of plastic and provide a protective cover to the first wire 13A and the second wire 13B. The front gearshift controlling disc 10 releases or retrieves the first wire 13A by unwinding or winding the first wire 13A around the front gearshift controlling disc 10. The rear gearshift controlling disc 11 releases or retrieves the second wire 13B by unwinding or winding the second wire 13B around the rear gearshift controlling disc 11. In general, there are various sprockets fitted on the axle 102, for example, a small sprocket (not shown), a large sprocket 14 and a medium sprocket 15.

Figure 3:
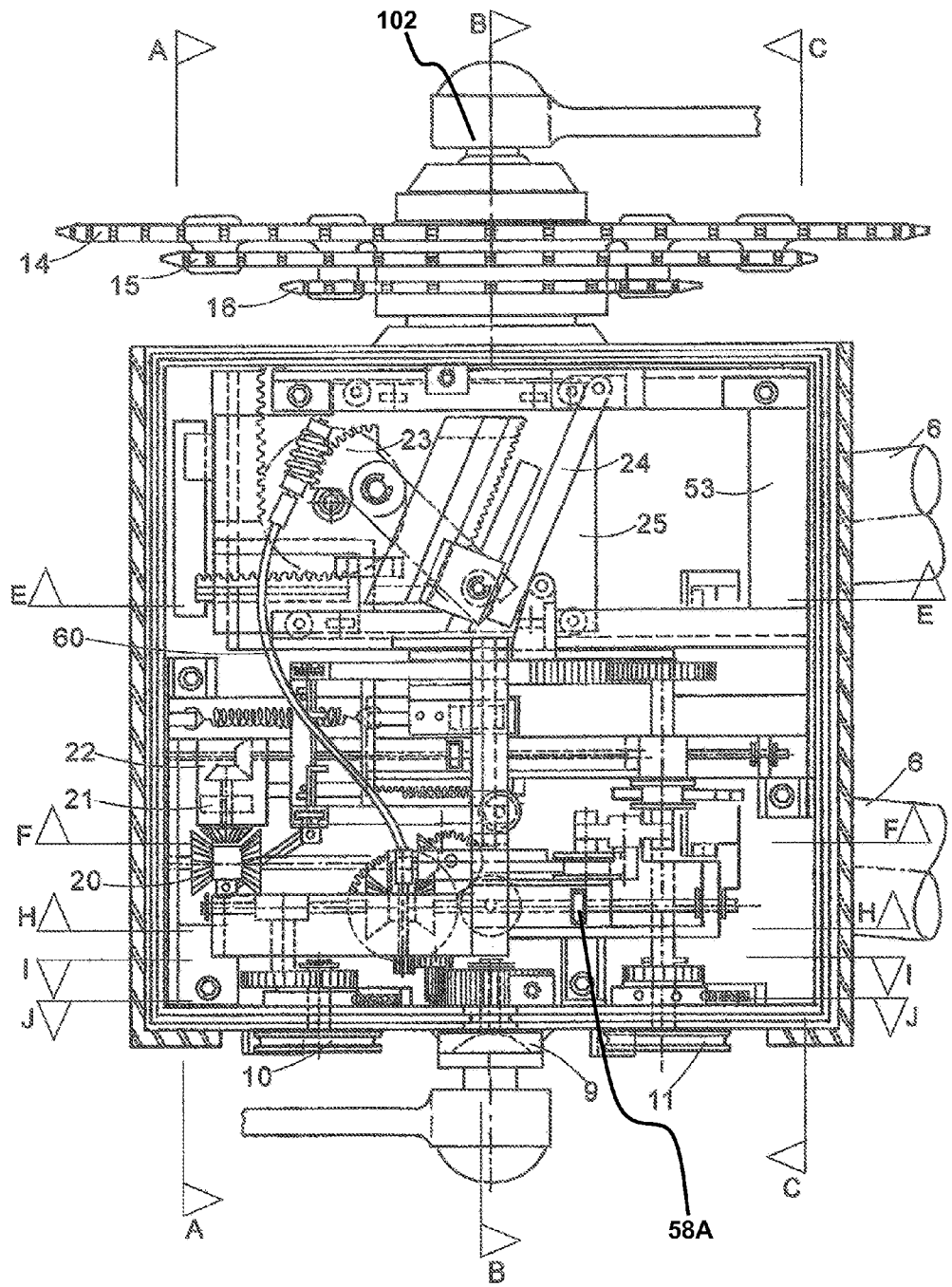
FIG. 3 depicts a partial cut away detail plan view of an automatic transmission device according to one embodiment of the present invention.

FIG. 3 depicts a partial cut away detail plan view of an automatic transmission device according to one embodiment of the present invention. Various sprockets are fitted on the axle 102, for example, the large sprocket 14, the medium sprocket 15 and the small sprocket 16. The body strength selector 9 adjusts the orientation of a push arm 23 through a flexible draft shaft 60. The push arm 23 controls the movement of the swing arm 24 and the tackle 25. The movement of the tackle 25 controls the rotation of the rear gearshift controlling disc 11. A frame 53 further supports the automatic transmission device. A sliding block 22 is controlled by the inertia flywheel 21 and the gear assembly 20.

Figure 4:
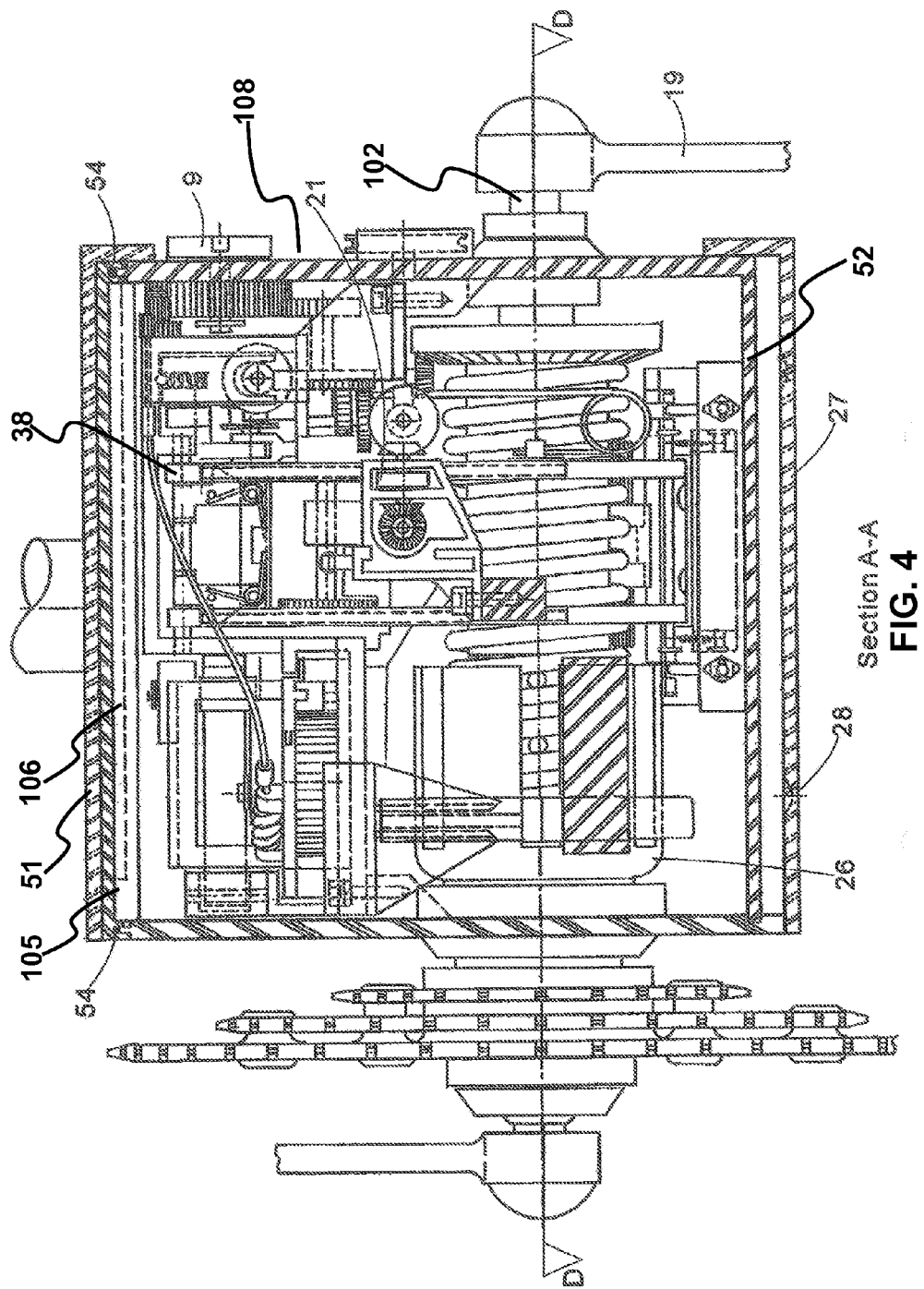
FIG. 4 depicts a cross-sectional view of the automatic transmission device along the A-A axis in FIG. 3.

FIG. 4 depicts a cross-sectional view of the automatic transmission device along the A-A axis in FIG. 3. There is a plurality of drainage holes 28 on the frame 27 such that any fluid such as water entering into the automatic transmission device 1 through the frame 27 can be drained away through the drainage holes 28. A torque sensor 26 is installed onto the axle 102. The torque sensor 26 senses the torque generated by the crank 19. A housing 52 has a cover 51 which seals the housing 52 with a number of dust battens 54 fitted between the cover 51 and the housing 52. The housing 52 has a panel 108 on which the body strength selector 9 is available for adjustment. The axle 102 goes through the panel 108 to communicatively connect with the crank 19. A release 38 for separating the upper and the lower parts of the weight hanger is housed in the housing 52. An inertia flywheel 21 is available in the housing 52. The frame 27 has a guide 106 which is fitted with the slot 105 of the cover 51 when the housing 52 is installed into the frame 27.

Figure 5:
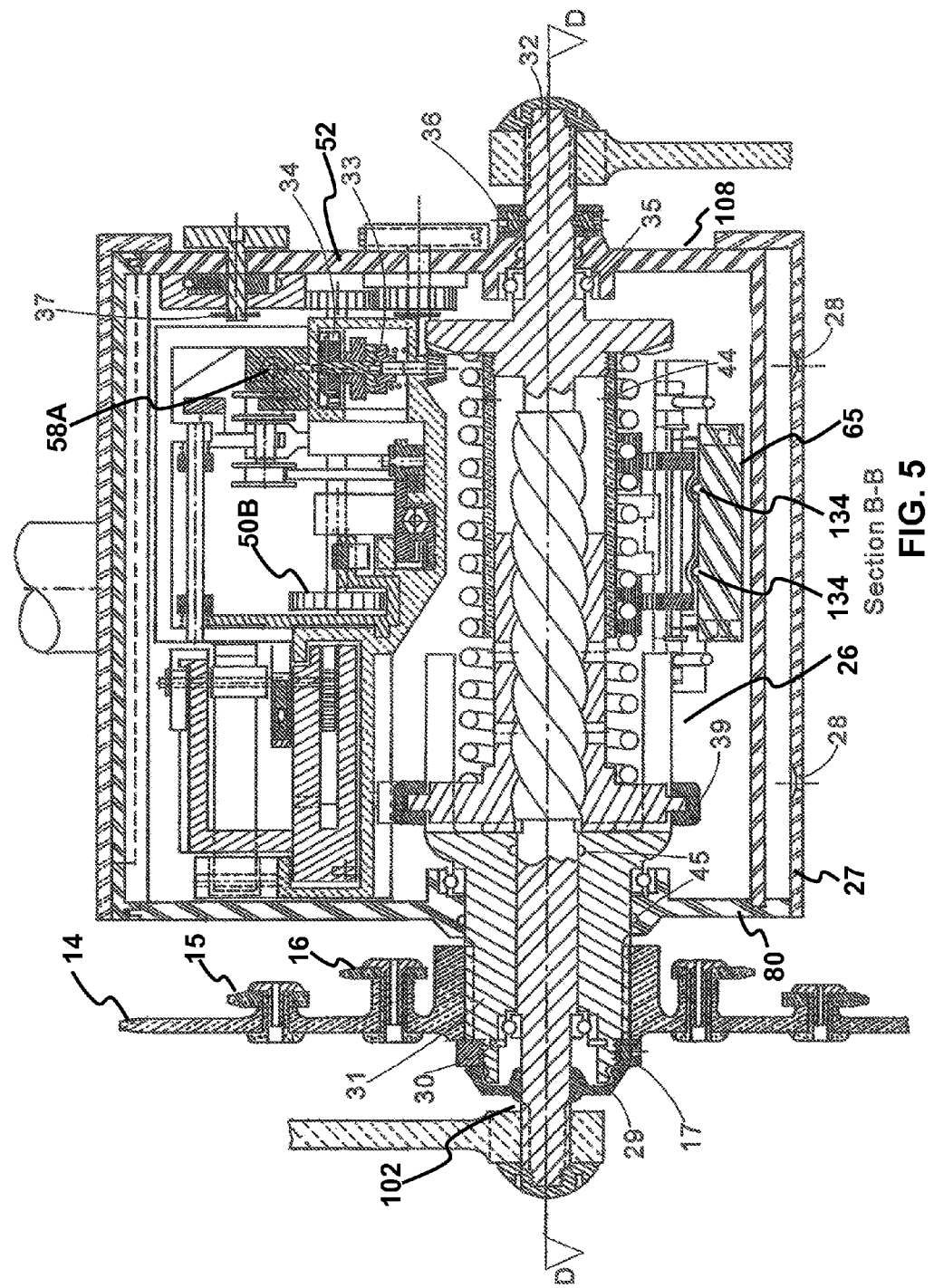
FIG. 5 depicts a cross-sectional view of the automatic transmission device along the B-B axis in FIG. 3.

FIG. 5 depicts a cross-sectional view of the automatic transmission device along the B-B axis in FIG. 3. One or more drainage holes 28 are found on the frame 27. The torque sensor 26 contains a number of components including, but not limited to: a retaining ring 17, a dust cover 29, a flexible retaining ring 30, an output shaft 31, a plurality of dust O-rings 45, a torque variation output ring 39, a plurality of ball bearings 35 and an input shaft 32. Both the front gearshift controlling disc (not shown) and the rear gearshift controlling disc 11 are secured onto the panel 108 of the automatic transmission device by C-shaped flexible latches 37. An anti-reverse device 34 has a plurality of ratchets 33. The axle 102 has an assembly of the large sprocket 14, the medium sprocket 15 and the small sprocket 16 fixed on it concentrically at its first portion. A snap ring 36 is placed around the axle 102 to secure the axle 102 onto the panel 108 of the housing 52. A receiving gear 50B is housed in the housing 52.

Figure 6:
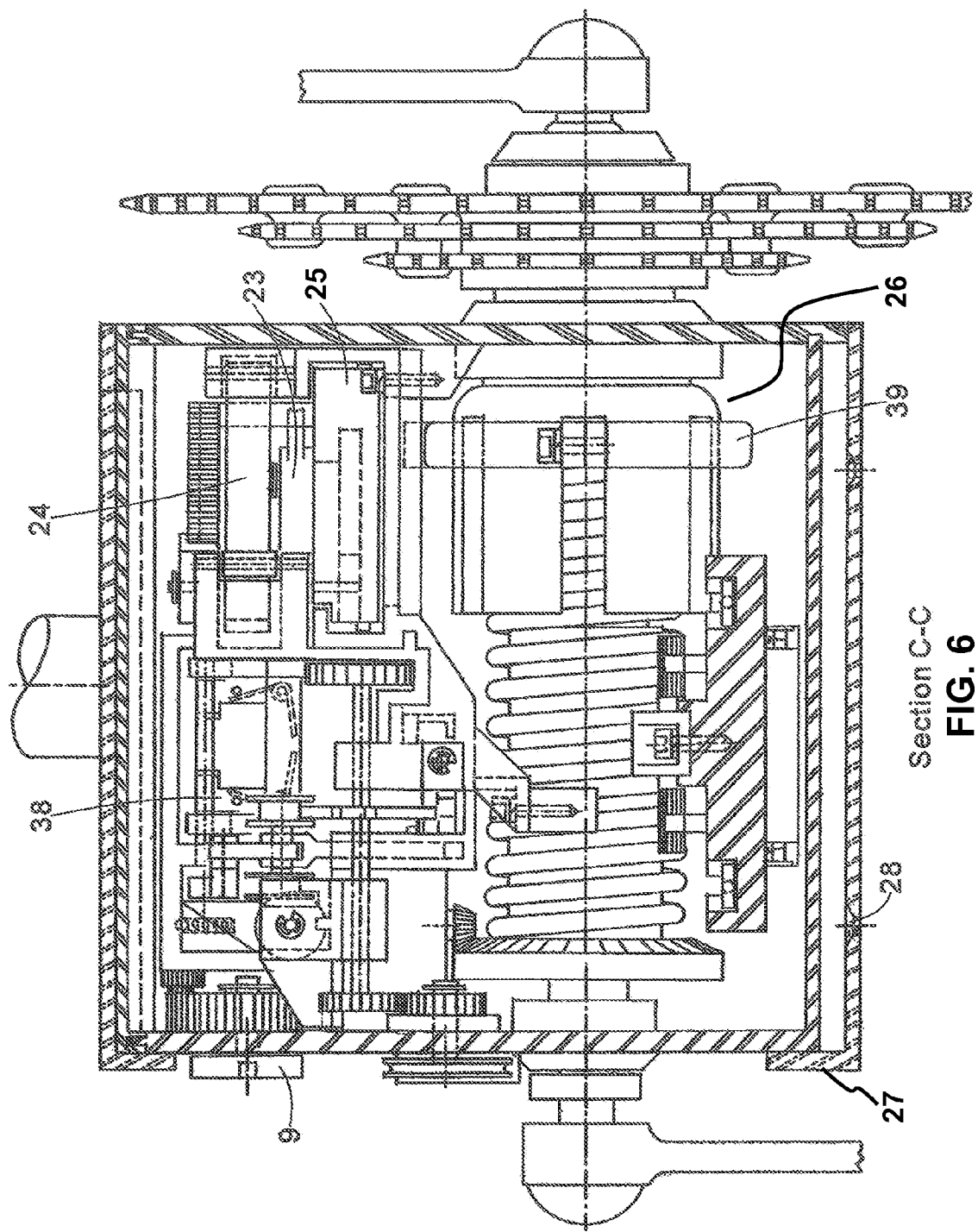
FIG. 6 depicts a cross-sectional view of the automatic transmission device along the C-C axis in FIG. 3.

FIG. 6 depicts a cross-sectional view of the automatic transmission device along the C-C axis in FIG. 3. The drainage holes 28 drain away any fluid from the interior of the frame 27. The torque variation output ring 39 of the torque sensor 26 controls the movements of the push arm 23, thus moving the swing arm 24 and the tackle 25. There is a release 38 for separating the upper and the lower parts of the weight hanger.

Figure 7:
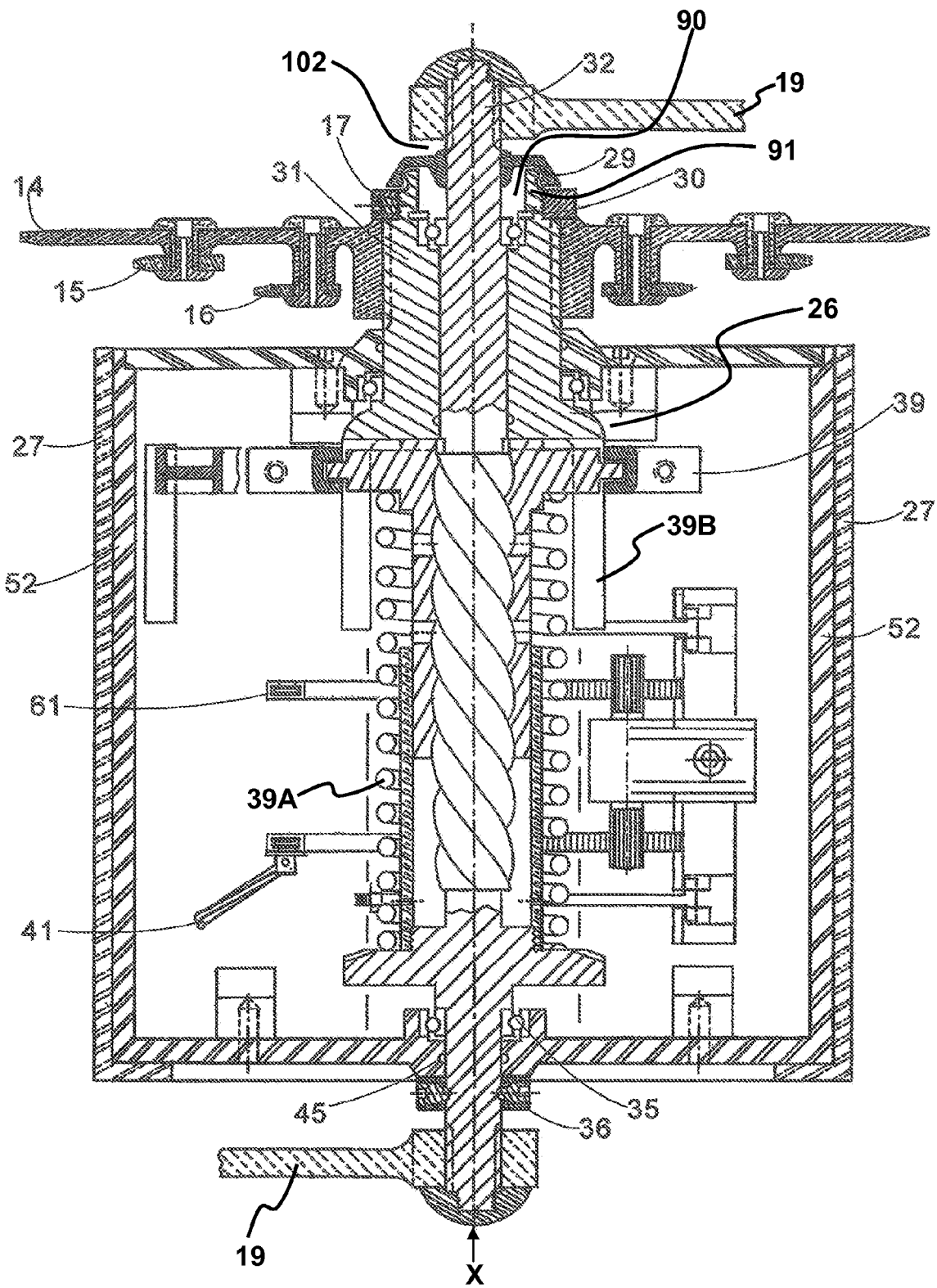
FIG. 7 depicts a cross-sectional view of the automatic transmission device along the D-D axis in FIG. 4.

FIG. 7 depicts a cross-sectional view of the automatic transmission device along the D-D axis in FIG. 4. The torque sensor 26 is a device connecting to the crank 19 with left pedal at one end and to the crank 19 with right pedal at the other end. In some embodiments, the torque sensor 26 is arranged along the axle 102 of a bicycle where the axle 102 connects to the crank 19 with left pedal 18 at one end and to the crank 19 with right pedal 18 at the other end. The torque sensor 26 is housed in a housing 52 which is located at the bottom portion of a bicycle. The housing 52 is further supported by a frame 27 so that the housing 52 is secured at the bottom ends of the seat tube 5 and the down tube 4 of a bicycle. The housing 52 is fixed to the frame 27 with a number of screws.

In one embodiment, the axle 102 has an assembly of the large sprocket 14, the medium sprocket 15 and the small sprocket 16 fixed on it concentrically at its first portion. In other embodiments, this assembly of sprockets includes a number of sprockets other than three and the size of each sprocket is determined according to the design. When a person steps on the pedal 18 to rotate the axle, the assembly of sprockets will rotate in the same direction as the rotation of the axle. The axle 102 is made of an inner portion which is also known as an input shaft 32, and an outer portion which is also known as an output shaft 31.

The output shaft 31 is fitted between the input shaft 32 and the assembly of sprockets. The output shaft 31 has a recess 90 at its opening 91 which faces the crank 19. The recess 90 receives a flexible retaining ring 30 for the inner wall of the opening 91 such that the input shaft 32 is prevented from displacing along the axle. The opening 91 carries threads on its outer wall which allow a retaining ring 17 to be screwed on. If the assembly of sprockets needs to be removed from the axle, the retaining ring 17 needs to be removed first and the retaining ring 17 secures the position of the assembly of sprockets on the output shaft 31. The end of the opening 91 is closed by a dust cover 29 which prevents foreign materials such as dust or liquid from entering into the recess 90.

When the torque sensor 26 is housed in the housing 52, the axle 102 extends through the housing 52 from the first opening on one side to the second opening on the opposite side. There is a dust O-ring 45 between the axle 102 and the inner wall of each of the openings. The dust O-ring 45 is capable of preventing foreign materials such as dust and liquid from entering into the housing 52. A snap ring 36 is placed on the second opening of the housing 52 such that the snap ring 36 can strengthen the function of the flexible retaining ring 30, which is so slim in construction. When there is heavy impact being applied to the axle 102 in the direction of X (see FIG. 7), the snap ring 36 can assist the flexible retaining ring 30 to prevent the input shaft 32 from displacing along the axle.

Furthermore, the axle 102 is placed on the inner wall of the housing 52 at the first opening and the second opening of the housing 52. There are ball bearings 35 between the axle 102 and the first opening as well as between the axle 102 and the second opening. These ball bearings 35 support the axle 102 when the axle 102 is rotating.

Figure 8:
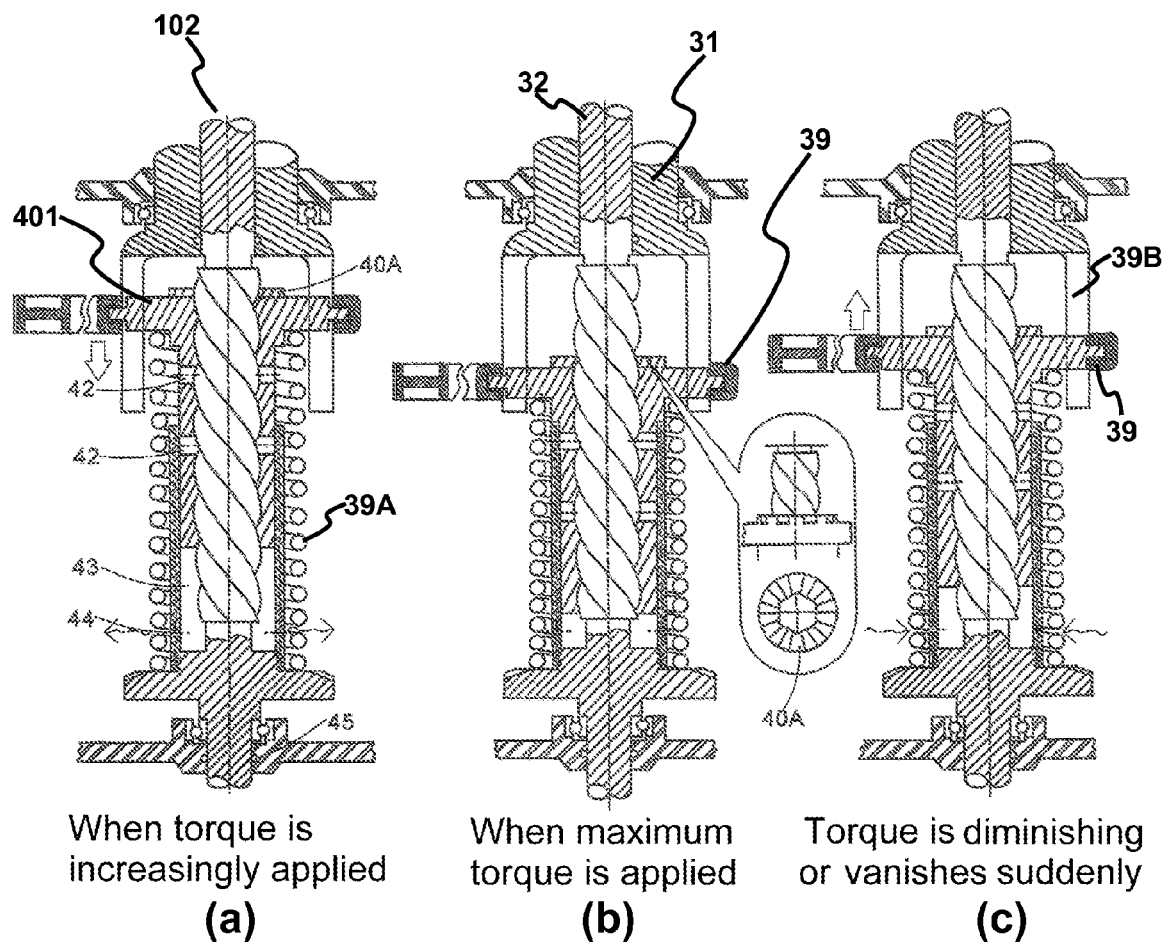
FIG. 8 depicts a partial cut away view of the torque sensor of an automatic transmission device according to one embodiment of the present invention in various states: (a) when torque is increasingly applied; (b) when maximum torque is applied; (c) when torque is diminishing or vanishes suddenly.

FIG. 8 depicts a partial cut away view of the torque sensor of an automatic transmission device according to one embodiment of the present invention in various states: (a) when torque is increasingly applied; (b) when maximum torque is applied; (c) when torque is diminishing or vanishes suddenly. When a person steps on one or both of the pedals in order to drive one or both of the wheels to rotate, a torque is being exerted onto the pedals. A larger torque is required to turn the wheels in various circumstances, for example, when the bicycle is going up a slope or the bicycle is dragged by a heavy load behind. The magnitude of the torque is detected by the torque sensor so that when the torque is increasing as shown in FIG. 8(a), a piston 401 moves into an air-damping chamber 43 along a threaded portion on the axle. When the torque is decreasing, the piston 401 moves out of the air-damping chamber 43 or be restored to the initial position by a coil spring 39A. The piston 401 has a number of lubricant filling holes 42 on its body, providing a pathway between its outer wall and inner wall. Lubricant is added to the threaded portion through these lubricant filling holes 42.

One end of the piston 401 which is outside of the air-damping chamber 43 is connected with a torque variation output ring 39. The torque variation output ring 39 moves in accordance with the movement of the piston 401. The output shaft 31 has one or more extensions 39B which act as a guide for supporting the movement of the torque variation output ring 39 on the extensions 39B.

There are one or more orifices 44 on the body of the air-damping chamber 43. Air can move in and out of the air-damping chamber 43 through the orifices 44. When the piston 401 moves into the air-damping chamber 43, air will be expelled out of the air-damping chamber 43 through the orifices 44. Each orifice 44 is in a size that certain pressure is required in the air-damping chamber 43 to expel the air away through the orifices 44. Similarly, each orifice 44 is also in such a size that certain pressure is required in the air-damping chamber 43 to suck the air into the air-damping chamber 43 through the orifices 44. This provides a damping effect to the motion of the piston 401.

As the torque keeps increasing, the piston 401 will move further into the air-damping chamber 43 until the piston 401 reaches a position that its inward movement is stopped by the coil spring 39A itself as shown in FIG. 8(b). When the torque decreases, for example, if the slope decreases or the cyclist lifts his feet away from the pedals, the coil spring 39A will apply a force on the piston 401 to move the piston 401 out of the air-damping chamber 43 and restore the piston 401 to its initial position as illustrated in FIG. 8(c). In the meantime, the air will be sucked into the air-damping chamber 43 at a rate which depends on the size of the orifices 44 on the air-damping chamber 43. The low pressure in the air-damping chamber 43 not only creates a suction force drawing the air into the air-damping chamber 43 but also prevents the piston 401 from moving too fast out of the air-damping chamber 43 by the coil spring 39A.

The top of the piston 401 which stays outside of the air-damping chamber 43 has a corrugated surface 40A around the opening along the axle. The corrugated surface reduces the area of the piston 401 in contact with other surfaces and thus reduces the chances that the top of the piston 401 gets stuck onto other surfaces even in case of being covered with lubricants. The corrugated surface also facilitates the entry of the lubricants into the axle 102 such that the sensitivity of the torque sensor 26 can be maintained.

FIG. 9 depicts the working mechanism of the body strength selector of an automatic transmission device according to one embodiment of the present invention when various profiles are selected: (a) Male is selected; (b) Female is selected; (c) Child is selected. The piston of the torque sensor (not shown) is connected to a pushing rack 47. The pushing rack 47 moves in the same direction as the piston. The pushing rack 47 has teeth on one side which fits with a transfer gear 92. The transfer gear 92 drives the receiving rack 48 on the tackle 25. The tackle 25 has a lubricant filling hole 42 where the lubricant is applied to the axle of the transfer gear 92 to keep the rotation of the transfer gear 92 smooth. When the torque increases as detected by the torque sensor, the pushing rack 47 moves downwards, rotating the transfer gear 92 in an anti-clockwise direction. When the transfer gear 92 rotates in an anti-clockwise direction, the receiving rack 48 moves in a direction away from the pushing rack 47. The tackle 25 follows the movement of the receiving rack 48 and moves away from the pushing rack 47.

When the receiving rack 48 moves away from the pushing rack 47, the receiving rack 48 will eventually be stopped by a spring 46. The spring 46 provides a damping effect to the movement of the receiving rack 48 away from the pushing rack 47 and prevent the tackle 25 from having an over displacement away from the pushing rack 47. The spring 46 avoid the receiving rack 48 going too far away from the pushing rack 47 and losing contact with the transfer gear 92. Furthermore, when the body strength selector 9 is selected to be W (woman) or CH (child) and the receiving shaft 50 has reached its maximal allowable displacement, if the torque variation output ring 39 continues to provide excess displacement to the receiving shaft 50, the spring 46 allows the receiving rack 48 to receive such an excess displacement such that any damage to the tackle 25, the pushing shaft 49, or the swing arm 24 is prevented.

The body strength selector 9 is connected with a number of gears to move a flexible draft shaft 60. In one embodiment, the body strength selector 9 has a slot which is to receive a flat object like a coin or the tip of a screw-driver.

When the body strength selector 9 is rotated in a clockwise direction from M to W as shown in FIG. 9(b), the flexible draft shaft 60 will rotate in a clockwise direction such that the threaded head of the flexible draft shaft 60 engages with the middle of the threaded portion of a push arm 23. The push arm 23 consequently rotates in an anti-clockwise direction and moves a pushing shaft 49 upwards along a sawteeth track.

Before moving upwards, the pushing shaft 49 is in contact with the swing arm 24 at a position closer to the free end of the swing arm 24. When the push arm 23 moves away from the pushing rack 47 together with the tackle 25, the moment of the free end of the swing arm 24 is limited because it is amplified by a limited distance between the contact point provided by the pushing shaft 49 and the free end of the swing arm 24.

After moving upwards, the pushing shaft 49 is in contact with the swing arm 24 at a position further away from the free end of the swing arm 24, around the middle section of the swing arm 24. When the push arm 23 moves away from the pushing rack 47 together with the tackle 25, the moment of the free end of the swing arm 24 is greater because it is amplified by a larger distance between the contact point provided by the pushing shaft 49 to the swing arm 24 and the free end of the swing arm 24.

Therefore, the tackle 25 needs to travel less away from the pushing rack 47 in order to move the receiving shaft 50 over the same distance as the tackle 25 does when the body strength selector 9 is selected to M as shown in FIG. 9(a). In other words, a smaller torque is required in order to switch to a lower gear after the body strength selector 9 is switched from M to W. The lowest gear is selected even when the bicycle goes up a mild slope rather than having the lowest gear selected only when the bicycles goes up a steeper slope as in the case of selecting the body strength selector 9 to M.

When the body strength selector 9 is rotated in a clockwise direction from W to CH, the flexible draft shaft 60 will rotate in a clockwise direction such that the threaded head of the flexible draft shaft 60 engages with the top part of the threaded portion of the push arm 23. The push arm 23 consequently rotates in an anti-clockwise direction and moves a pushing shaft 49 upwards along the sawteeth track.

After moving upwards further along the sawteeth track, the pushing shaft 49 is in contact with the swing arm 24 at a position closer to the fixed end the swing arm 24. When the push arm 23 moves away from the pushing rack 47 together with the tackle 25, the moment of the free end of the swing arm 24 is even greater because it is further amplified by a larger distance between the contact point provided by the pushing shaft 49 to the swing arm 24 and the free end of the swing arm 24.

Therefore, when the body strength selector 9 is selected to be CH as shown in FIG. 9(c), a lesser distance the tackle 25 travels away from the pushing rack 47 is required to move the swing arm 24 to have the largest swing possible. The receiving shaft 50 will move to its furthest end and switch the system to the lowest gear even when the torque detected is less than what is required when the body strength selector 9 is selected to be either M or W.

Figure 10:
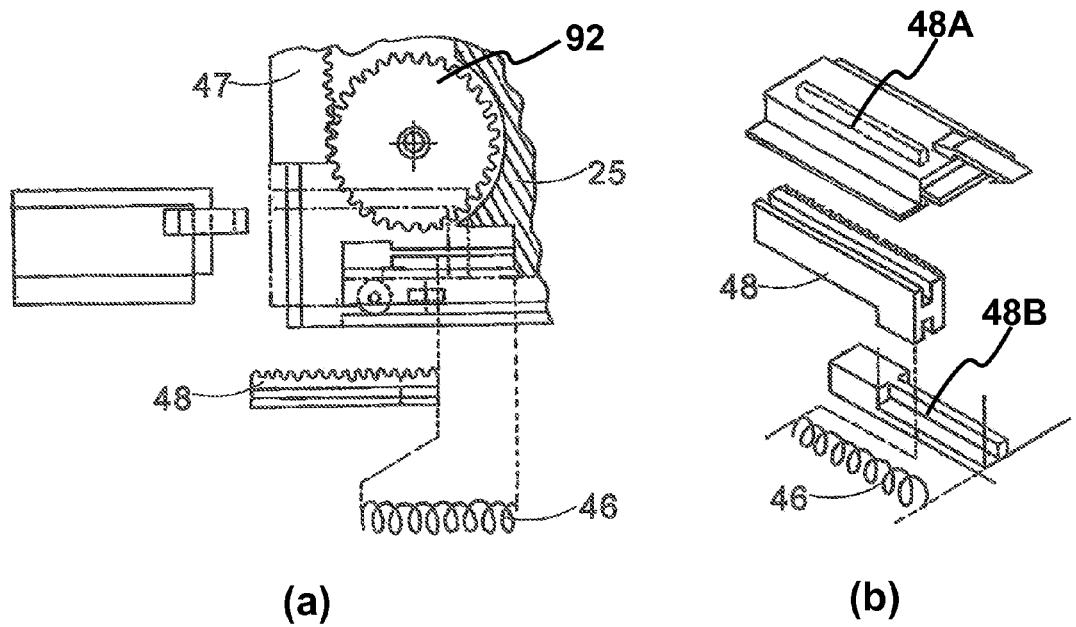
FIGS. 10(a) and 10(b) depicts an exploded view of components interacting with the receiving rack of an automatic transmission device according to one embodiment of the present invention.

FIGS. 10(a) and 10(b) depicts an exploded view of components interacting with the receiving rack 48 of an automatic transmission device according to one embodiment of the present invention. The top view shows the pushing rack 47 engages with the transfer gear 92 to move the tackle 25 with the help of the receiving rack 48. There is a slot on each side of the receiving rack 48 respectively. Each slot of the receiving rack 48 is fitted onto a first rail 48A and a second rail 48B to guide the movement of the receiving rack 48. The spring 46 is arranged at one end of the receiving rack 48 to restore the receiving rack 48 to its initial position.

When the torque decreases as detected by the torque sensor 26, the pushing rack 47 moves upwards, rotating the transfer gear 92 in a clockwise direction. When the transfer gear 92 rotates in a clockwise direction, the receiving rack 48 moves in a direction towards the pushing rack 47. The tackle 25 follows the movement of the receiving racks 48 and moves towards the pushing rack 47.

When the receiving rack 48 moves away from the pushing rack 47, a swing arm 24 swings in an anti-clockwise direction with one end fixed relative to the motion of the tackle 25. The free end of the swing arm 24 will push a receiving shaft 50 in a direction away from the pushing rack 47.

Figure 11:
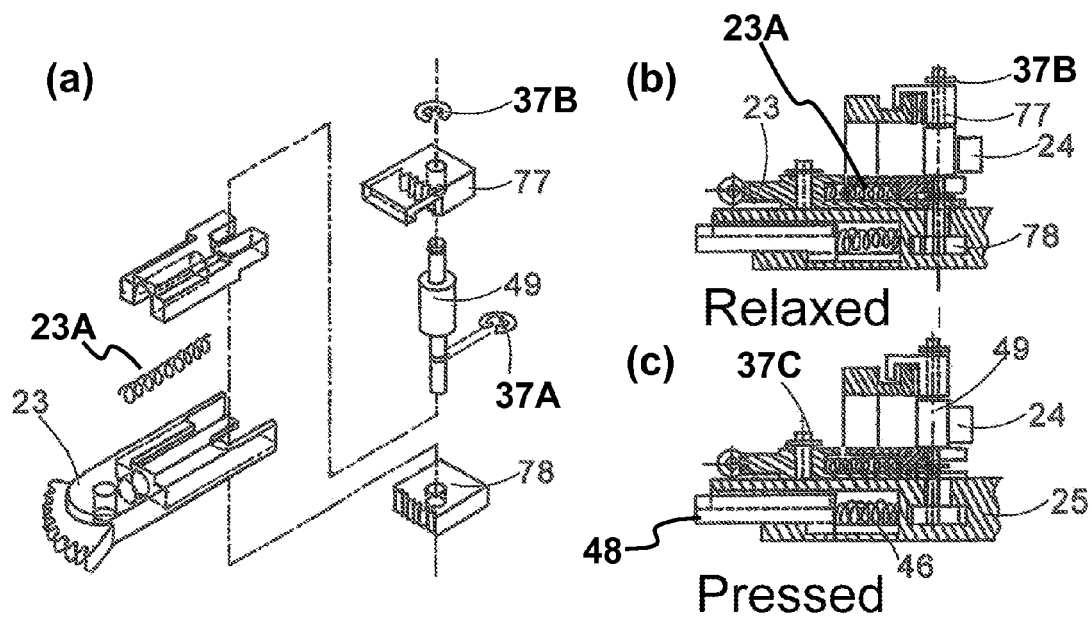
FIG. 11(a) depicts an exploded view of the push arm of an automatic transmission device according to one embodiment of the present invention.
FIG. 11(b) and FIG. 11(c) depict the working mechanism of a push arm of an automatic transmission device according to one embodiment of the present invention corresponding to various stages (b) when the push arm is relaxed; (c) when the push arm is pressed.

FIG. 11(a) depicts an exploded view of the push arm of an automatic transmission device according to one embodiment of the present invention. The push arm 23 has a spring 23A arranged in its body. The spring 23A maintains the assembly of a lower gear fixing block 78 and the upper gear fixing block 77 in a position that this assembly is not fixed onto the sawteeth track when the pushing shaft 49 is not pushing against the swing arm (not shown). The pushing shaft 49 has each of its ends arranged through an upper gear fixing block 77 and through a lower gear fixing block 78 respectively. There is a C-shaped flexible latch 37A which catches the end of the pushing shaft 49 after the end gets through the lower gear fixing block 78. There is another C-shaped flexible latch 37B which catches the other end of the pushing shaft 49 after the end gets through the upper gear fixing block 77.

FIG. 11(b) and FIG. 11(c) depict the working mechanism of a push arm of an automatic transmission device according to one embodiment of the present invention corresponding to various stages (b) when the push arm is relaxed; (c) when the push arm is pressed. FIG. 11(b) shows the lateral view of the push arm 23 when the pushing shaft 49 is not in contact with the swing arm 24. The spring 23A inside the push arm 23 will restore to its relaxing state and releases the assembly of gear fixing blocks from engaging with the sawteeth track. FIG. 11(c) shows the lateral view of the push arm 23 when the pushing shaft 49 pushes against the swing arm 24. There is a C-shaped flexible latch 37C which secures the push arm 23 at its pivot. When the pushing shaft 49 is pushing against the swing arm 24, the spring 23A inside the push arm 23 will be compressed and the assembly of gear fixing blocks is pressed against the sawteeth track to fix the pushing shaft 49 position along the sawteeth track.

Figure 12:
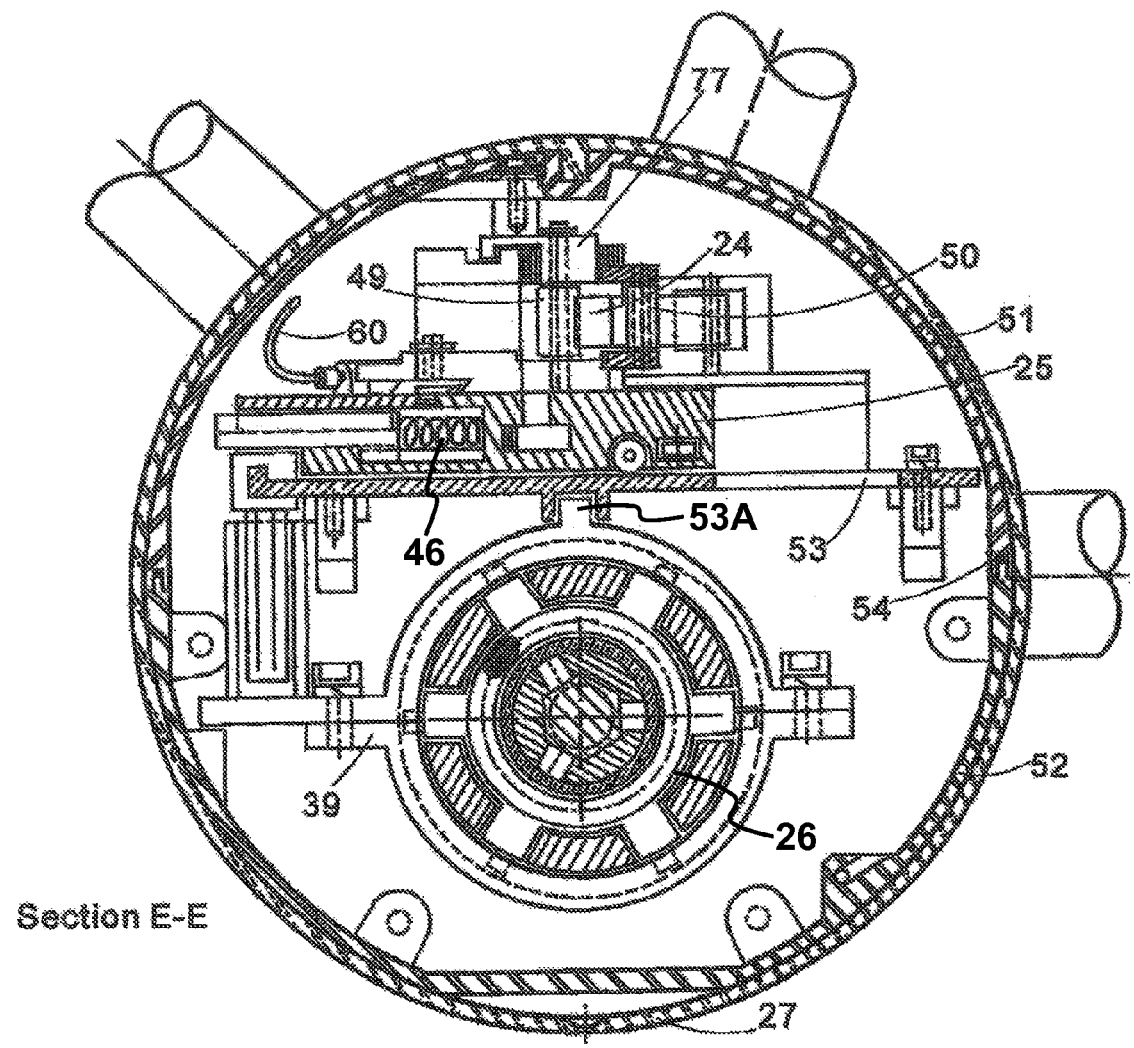
FIG. 12 depicts a cross-sectional view of the automatic transmission device along the E-E axis in FIG. 3.

FIG. 12 depicts a cross-sectional view of the automatic transmission device along the E-E axis in FIG. 3. The frame 27 holds the cover 51 and the housing 52 together within it. There are dust batten 54 between the cover 51 and the housing 52 to seal any gap between the cover 51 and the housing 52. The frame 53 fixes the position of the torque sensor 26. The movement of the torque variation output ring 39 is guided by a rail 53A on the frame 53. The tackle 25 slides on one side of the frame 53. The pushing shaft 49 moves the swing arm 24 to push the receiving shaft 50.

Figure 13:
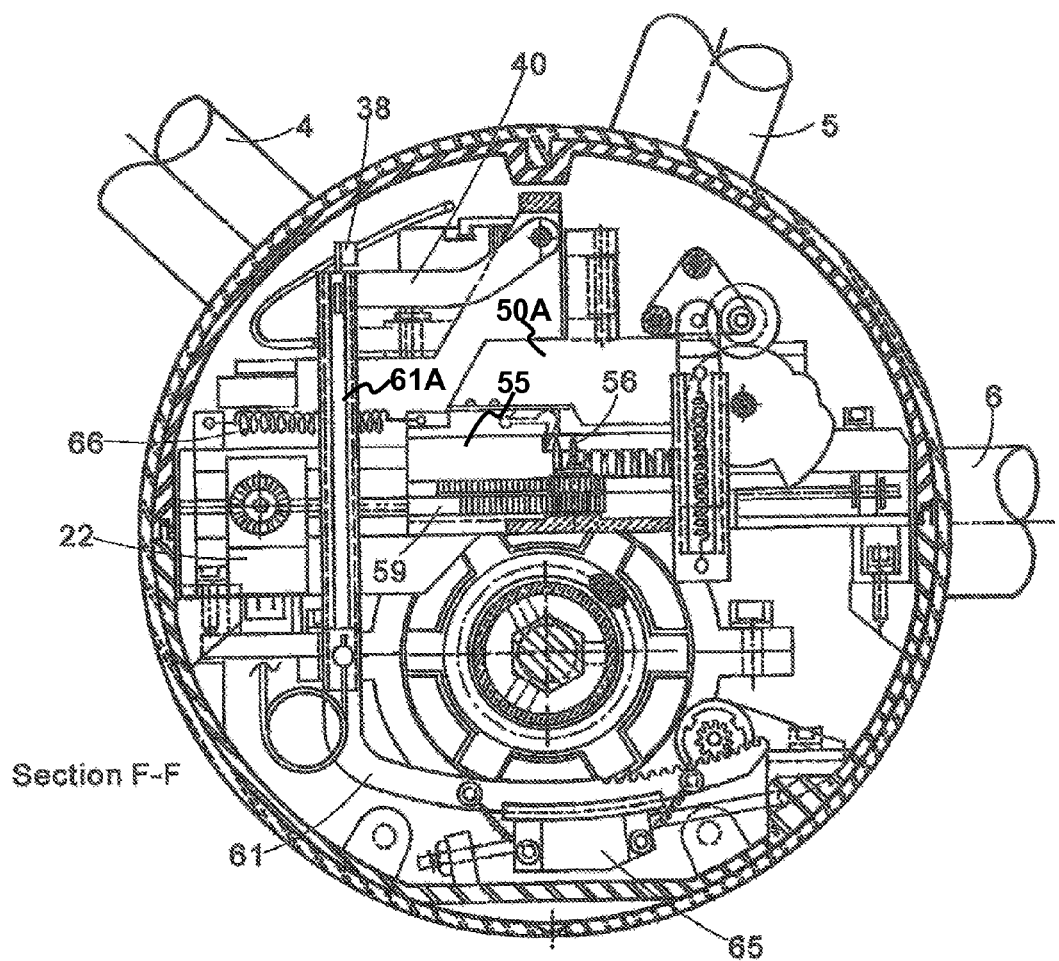
FIG. 13 depicts a cross-sectional view of the automatic transmission device along the F-F axis in FIG. 3.

FIG. 13 depicts a cross-sectional view of the automatic transmission device along the F-F axis in FIG. 3. The weight 65 is installed at the lower part of the weight crane 61.

The upper part of the weight hanger 40 is connected with the lower part of the weight hanger 61 through a bar 61A. The bar 61A can be released to separate the upper part of the weight hanger 40 and the lower part of the weight hanger 61 by a release 38 (See FIG. 4 and FIG. 13). The separation of the upper and lower parts of the weight hanger allows the easy access to other parts of the torque automatic transmission device and the removal, installation or maintenance of other parts of the torque automatic transmission device. The spring 66 provides a restoring force on the rack block 50A.

Figure 14:
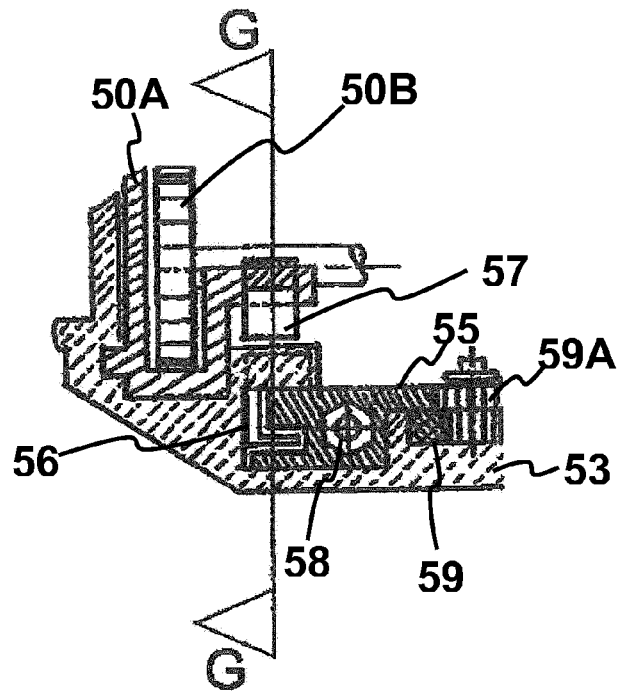
FIG. 14 depicts a view of the gear-blocker of an automatic transmission device according to one embodiment of the present invention.

FIG. 14 depicts a view of the gear-blocker of an automatic transmission device according to one embodiment of the present invention. One end of the rack block 50A is connected with a pull resilient spring (not shown) which provides a pulling force towards this end. The sliding rod 59 is engaged with a feedback gear 59A and the gear-blocker 55 is also engaged with the feedback gear 59A. When the gear-blocker 55 moves, the feedback gear 59A will rotate and move the sliding rod 59 in the same direction as the movement of the gear-blocker 55. The axle of the feedback gear 59A is supported by a frame 53 and the frame 53 provides various slots for different components such as the gear-blocker 55 and the sliding rod 59 to move above it. The receiving gear 50B is moved by the rack block 50A. The catch 56 will be caught by the latch 57 after it moves past the latch 57.

Figure 15:
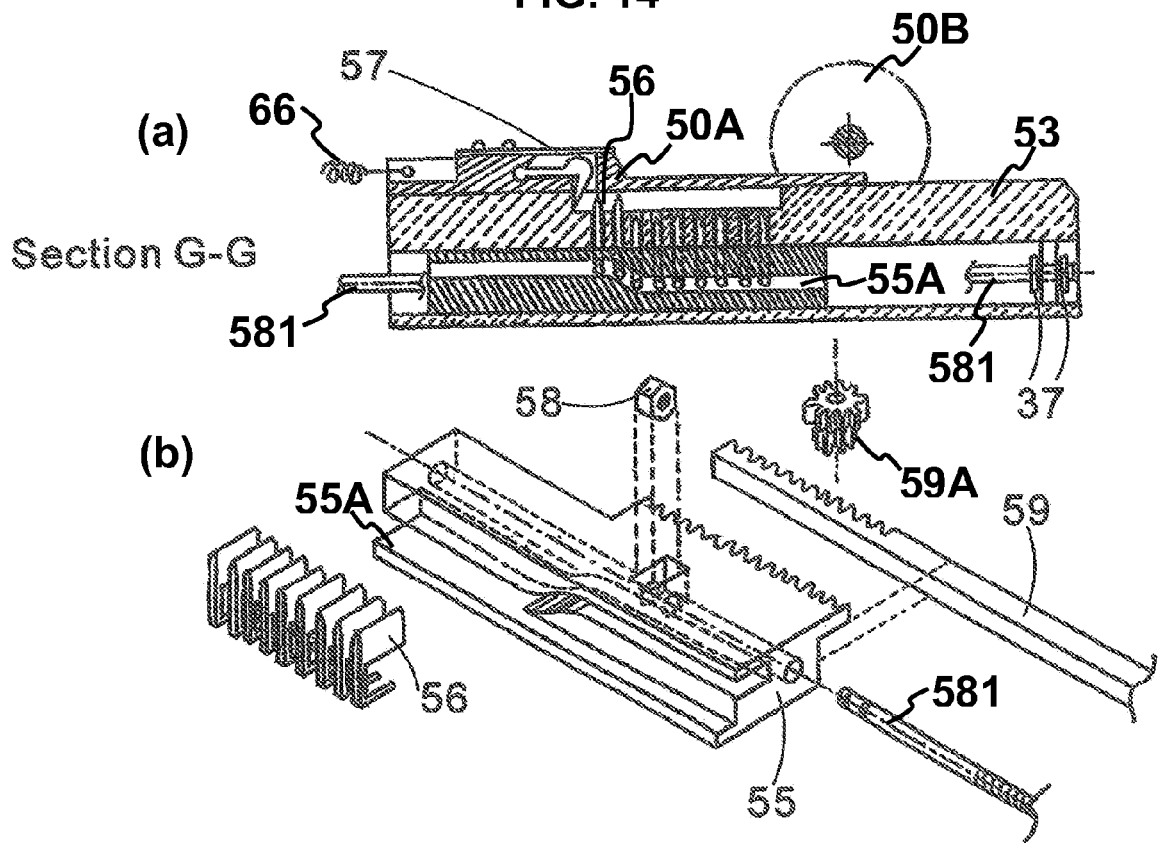
FIG. 15(a) depicts a cross-sectional view of the gear-blocker of the automatic transmission device along the G-G axis in FIG. 14.
FIG. 15(b) depicts an exploded view of the gear-blocker of an automatic transmission device according to one embodiment of the present invention.

FIG. 15(a) depicts a cross-sectional view of the gear-blocker of the automatic transmission device along the G-G axis in FIG. 14. A spring 66 provides a restoring force to the rack block 50A so that the receiving shaft 50 can always contact with the swing arm 24 (see FIG. 27) while the tackle 25 moves in a direction towards the pushing rack 47. The frame 53 houses the receiving gear 50B and the rack block 50A. The latch 57 has a shape of a hook and is configured to hook onto the catch 56. The rotating rod 581 is housed in a tunnel passage of the gear-blocker 55 and engages with the gear-block 55 via the nut 58.

FIG. 15(b) depicts an exploded view of the gear-blocker of an automatic transmission device according to one embodiment of the present invention. The gear-blocker 55 is designed to prevent the change of gear from occurring undesirably when the slope of the surface on which the bicycle is moving is changing. To determine whether a bicycle is moving up or down a slope, a slope sensor is implemented in a form of a weight arranged at the lower part of a weight hanger. Since the weight always tries to remain in a position pointing towards the centre of the earth, the upper part of the weight hanger rotates along a pivot in an anti-clockwise direction when the bicycle goes up a slope. The upper part of the weight hanger rotates along a pivot in a clockwise direction when the bicycle goes down a slope. In order to avoid the rotation of the weight hanger becoming too violent, a damper 64 (see FIG. 16) is arranged to engage with the teeth on the top part of the weight hanger so that the rotation of the weight hanger is restrained.

The gear-blocker 55 has a plurality of catches 56. Each catch 56 is a plate which stands upright on a track 55A in the gear-blocker 55. Each catch 56 is separated from one another by a certain distance. The track 55A is made up of two sections with the level of one section higher than the other. The plurality of catches 56 slides on the track 55A from one section to the other through a ramp between the two sections. When a catch 56 slides to the high-level section, the catch 56 is prevented from moving back to the low-level section by a latch 57. The gear-blocker 55 has a nut 58 fixed inside it such that the displacement of the nut 58 determines the displacement of the gear-blocker 55. When the gear-blocker 55 moves, the feedback gear 59A will rotate and move the sliding rod 59 in the same direction as the movement of the gear-blocker 55.

Figure 16:
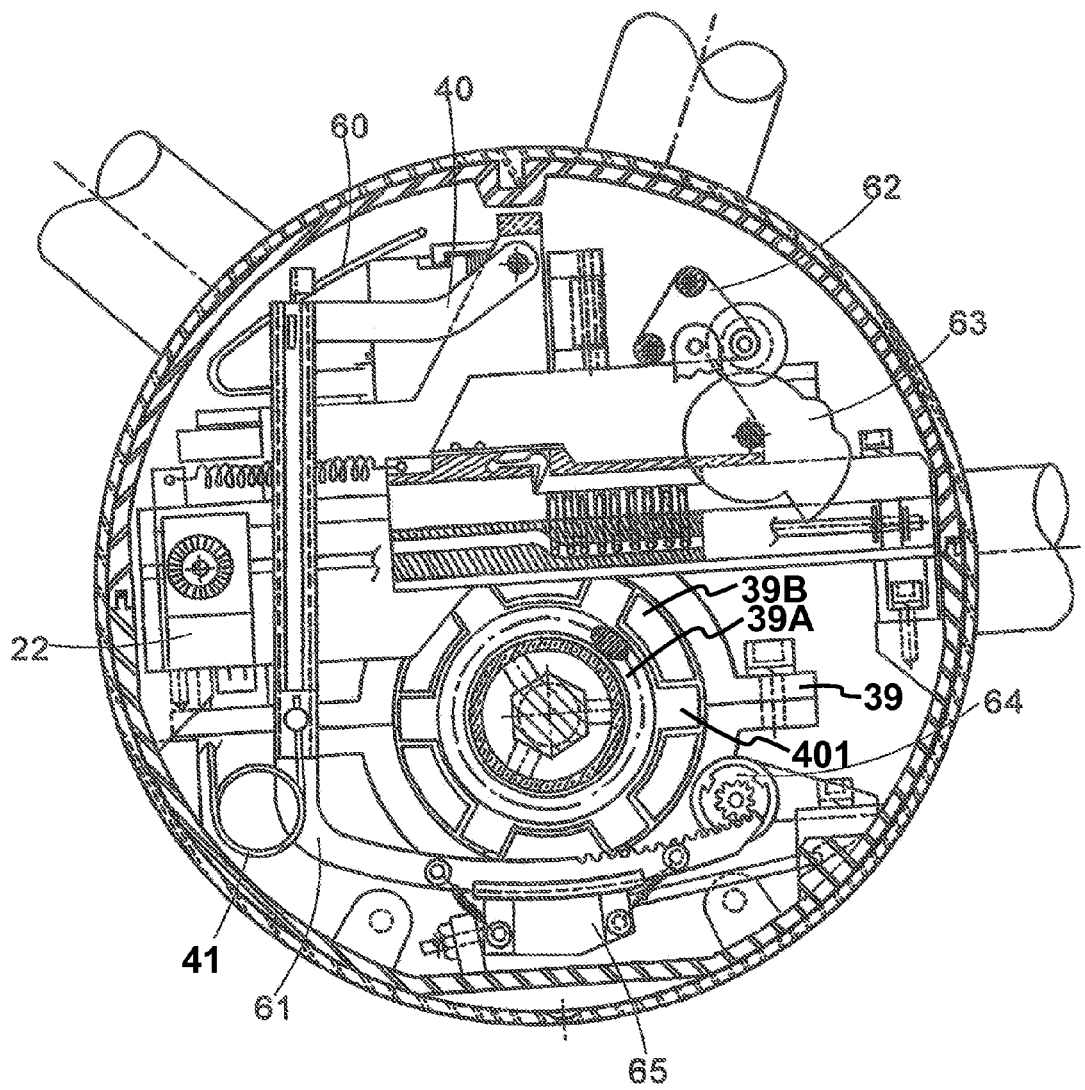
FIG. 16 depicts a cross-sectional view of the automatic transmission device along the F-F axis in FIG. 3 when the bicycle is heading downhill.

FIG. 16 depicts a cross-sectional view of the automatic transmission device along the F-F axis in FIG. 3 when the bicycle is heading downhill. When the bicycle is heading downhill or on a leveled land, the weight 65 leads the weight crane 61 to rotate in a clockwise direction. The damper 64 will to prevent any violent movement of the weight 65 from damaging other parts of the automatic transmission device. The weight crane 61 also move the sliding block 22 through the towbar 41. The balancing swing weight 62 is at a level which keeps contacting the portion of the cam 63 with the smallest radius.

Figure 17:
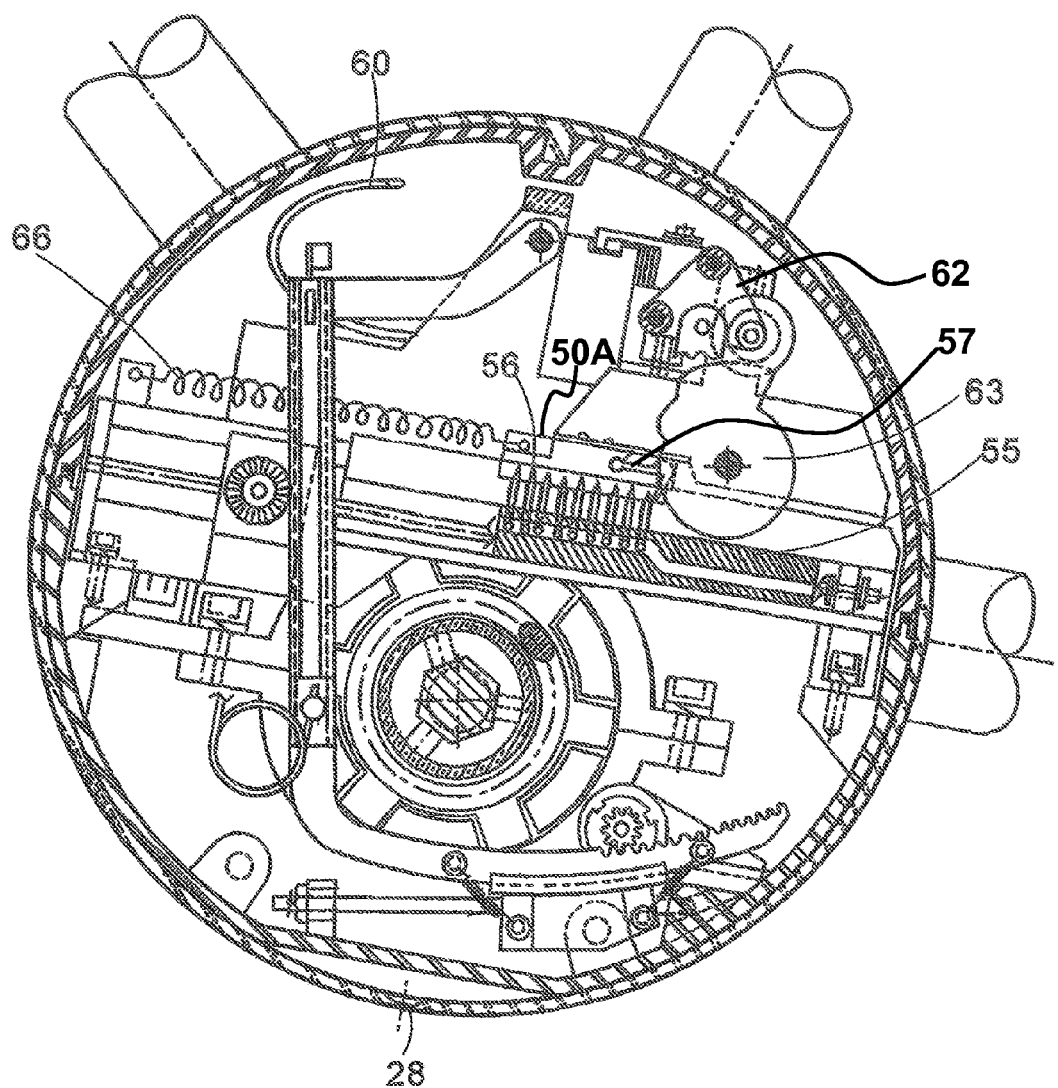
FIG. 17 depicts a cross-sectional view of the automatic transmission device along the F-F axis in FIG. 3 when the bicycle is heading uphill.

FIG. 17 depicts a cross-sectional view of the automatic transmission device along the F-F axis in FIG. 3 when the bicycle is heading uphill. When the bicycle is heading uphill, the catches 56 in the gear-blocker 55 will move to a position that they are caught by a latch 57 to prevent the gearshift from the uphill configuration to the downhill configuration, for example, switching from having the chain engaged with the largest rear sprocket to having the chain engaged with a smaller rear sprocket. Meanwhile, the cam 63 has its portion with the larger radius in contact with the balancing swing weight 62. The spring 66 restores the rack block 50A to an initial position by providing a resilient force on it.

Figure 18:
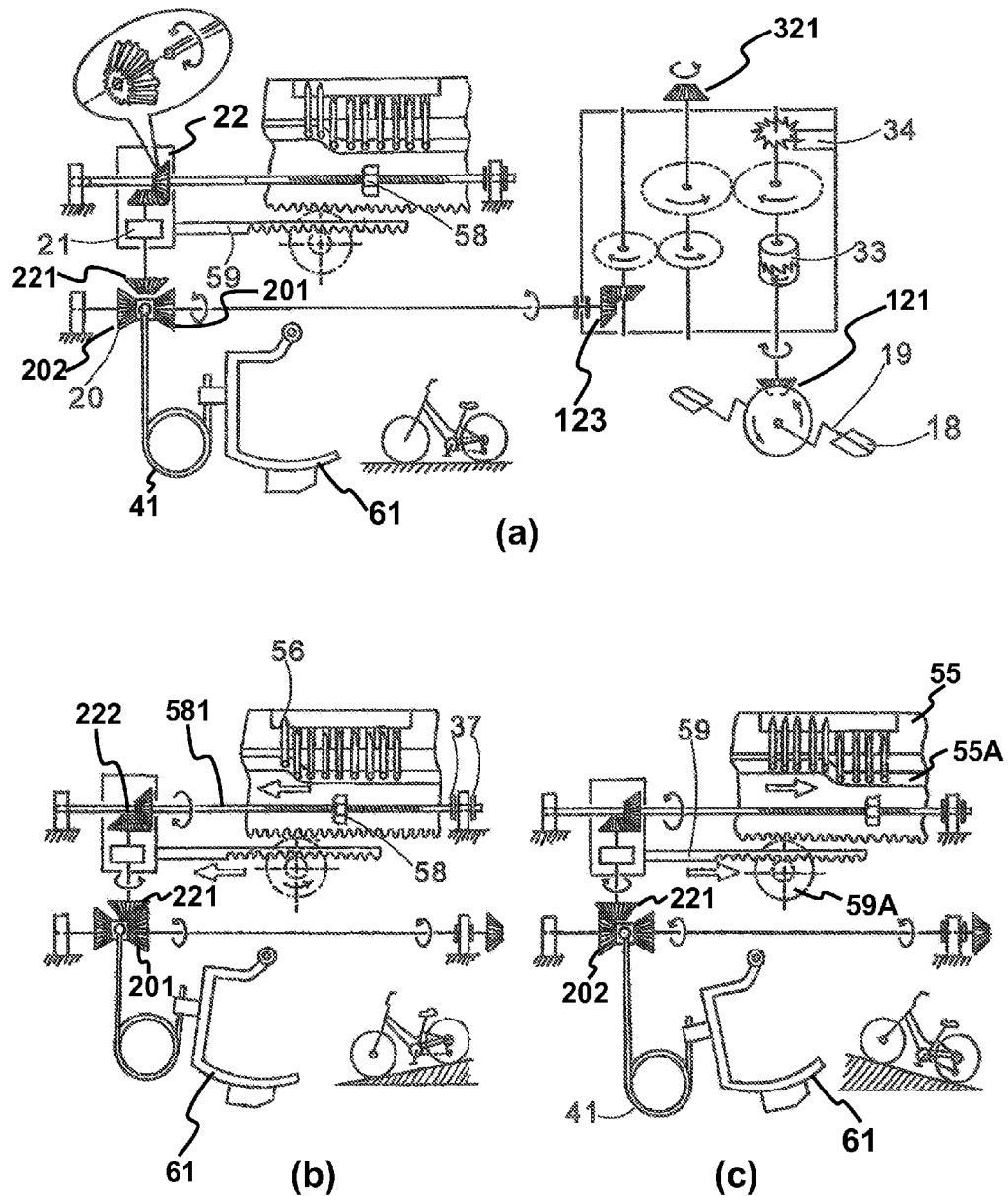
FIG. 18 depicts the working mechanism of the gear-blocker of an automatic transmission device at different slopes according to one embodiment of the present invention.

FIG. 18 depicts the working mechanism of the gear-blocker of an automatic transmission device at different slopes according to one embodiment of the present invention. When the bicycle travels on a level ground, the pedals 18 and cranks 19 rotates the axle to keep moving. The rotation of the axle in an anti-clockwise direction rotates a ratchet 33 in a clockwise direction, where the viewing position to see the rotation direction is from page's left-hand side to right-hand side, or from the page's top side to bottom side. There are a gear 121 and an anti-reverse device 34 along the same axis as the ratchet 33. The anti-reverse device 34 avoids the axle from rotating in an opposite direction. The gear 121 will drive a system of gears which drives a gear assembly 20 in an anti-clockwise direction through another gear 123.

The gear assembly 20 includes mainly two bevel gears as shown in FIG. 20. One bevel gear is arranged at one side of the body of the gear assembly 20 and the other bevel gear is arranged at the opposite side. Both bevel gears have their teeth facing towards the body of the gear assembly 20. Both bevel gears rotate along the same axis and in the same direction. The body of the gear assembly 20 displaces along the axis but remains stationary relative to the rotation of both bevel gears. The body of the gear assembly 20 is connected to the weight hanger through a flexible towbar 41.

The flexible towbar 41 moves the gear assembly 20 along the axis of rotation of the bevel gears. When the bicycle is traveling on a level ground (see FIG. 18(a)), the gear assembly 20 is maintained by the flexible towbar 41 at a position such that neither of the bevel gears of the gear assembly 20 touches the lower bevel gear 221 of the sliding block 22. When the bicycle is going up a slope (see FIG. 18c), the weight hanger 61 swings in an anti-clockwise direction and enables the flexible towbar 41 to pull the gear assembly 20. The bevel gear 202 of the gear assembly 20 is shifted towards the lower bevel gear 221 of the sliding block 22 and engages with the lower bevel gear 221 of the sliding block 22. The lower bevel gear 221 of the sliding block 22 is arranged in a way that its rotational axis crosses with the rotational axis of the bevel gears of the gear assembly 20 and its teeth faces towards the teeth of bevel gears of the gear assembly 20.

As the bevel gear 202 of the gear assembly 20 rotates in an anticlockwise direction, the lower bevel gear 221 of the sliding block 22 rotates in a clockwise direction. The upper bevel gear 222 of the sliding block 22 rotates in a clockwise direction and rotates the rotating rod 581 in an anti-clockwise direction. The anti-clockwise rotation of the rotating rod 581 moves the gear-blocker 55 away from the sliding block 22 with the nut 58 screwing on the threaded portion of the rotating rod 581. This moves the catches 56 in the gear-blocker 55 onto the upper level section of the track 55A in the gear-blocker 55 to be caught by the latch 57 (see FIG. 27). The latch 57 keeps holding the catches 56 and allowing the cam 63 to stay in a position that provides the lowest bicycle gear.

Even when the cyclist stops cycling and the bicycle stay at an uphill position, the gear-blocker 55 prevents the cam 63 from returning to its position that a higher bicycle gear is provided because the latch 57 keeps holding the catches 56 and makes the gear-blocker 55 remain in its position.

The rotating rod 581 has its two ends fastened to a stand respectively and a C-shaped flexible latch 37 is arranged on the rotating rod 581 adjacent to the holes of the stand through which the rotating rod 581 lies to avoid the sliding of the rotating rod 581 against the stands.

When the bicycle is going down a slope (see FIG. 18(b)), the flexible towbar 41 pushes the gear assembly 20 as the weight hanger 61 swings in a clockwise direction and enables the flexible towbar 41 to push the gear assembly 20. The bevel gear 201 of the gear assembly 20 is shifted towards the lower bevel gear 221 of the sliding block 22 and engages with the lower bevel gear 221 of the sliding block 22. When the bevel gear 201 of the gear assembly 20 starts to leave the lower bevel gear 221 of the sliding block 22, the inertia flywheel 21 will keeps both bevel gears of the sliding block 22 rotating using the energy stored in the inertia flywheel 21. The inertia flywheel 21 further rotates both the bevel gear 221 and the bevel gears 222 of the sliding block 22 to ensure the bevel gear 221 leave the bevel gear 201 or the bevel gear 202 completely without bouncing back and forth between the bevel gear 201 and the bevel gear 202. This is to avoid the bevel gear 221 from bouncing back and forth between the bevel gear 201 and the bevel gear 202 unnecessarily and making unnecessary collisions with the bevel gear 201 or the bevel gear 202.

As the bevel gear 201 of the gear assembly 20 rotates in a clockwise direction, the lower bevel gear 221 of the sliding block 22 rotates in an anticlockwise direction. The upper bevel gear 222 of the sliding block 22 rotates in an anticlockwise direction and rotates the rotating rod 581 in a clockwise direction. The clockwise rotation of the rotating rod 581 moves the gear-blocker 55 towards the sliding block 22 with the nut 58 screwing on the threaded portion of the rotating rod 581. This moves the catches 56 in the gear-blocker 55 onto the lower level section of the track in the gear-blocker 55 to be stay away from the latch 57. The latch 57 no longer holds the catches 56 and allows the cam 63 to stay in any position.

FIG. 19 depicts a cross-sectional view of the automatic transmission device along the H-H axis in FIG. 3. FIG. 20 depicts multiple views and cross-sectional views of a gear assembly of bevel gears.

FIG. 21(a) depicts a top view of the gear-pusher of an automatic transmission device according to one embodiment of the present invention. FIG. 21(b) depicts a side view of the gear-pusher of an automatic transmission device according to one embodiment of the present invention. FIG. 21(c) depicts an exploded view of the gear-pusher of an automatic transmission device according to one embodiment of the present invention. The receiving shaft 50 is displaced by the swing arm 24. The push resilient spring 67 is used by the rack block 50A to restore the position of the rack block 50A when the gear pusher 68 moves against the feedback gear 59A, where the push resilient spring 67 performs the same function as that of the pull resilient spring 66 as shown in FIG. 15(a).

In another embodiment, the rack block 50A is actuated by a gear-pusher 68. The gear-pusher 68 moves in accordance with the inclination status of the weight crane. It can push the rack block 50A directly and independently without the participation of the swing arm (not shown). In other words, the receiving gear 50B is receiving the turning force via the movement of the rack block 50A. And the rack block 50A is actuated either by the gear-pusher 68 or by the swing arm 24, or even by both of them. In addition to the automatic transmission performed by the torque sensor, the gear-pusher 68 is capable of performing automatic transmission. However, the gear-pusher 68 can perform automatic transmission towards lower gears. The gear-pusher 68 further moves the feedback gear 59A so that the sliding rod 59 is shifted correspondingly through the feedback gear 59A.

The sliding rod 59 is communicatively connected to the sliding block 22. When the gear pusher 68 moves, the sliding block 22 will move in the same direction as the gear pusher 68 does through the interaction between the rack of the gear pusher 68 and the feedback gear 59A. The sliding block 22 moves in a speed lower than that of the gear pusher 68. The gear pusher 68 is a device providing a feedback function so that the sliding block 22 will stop moving when the equilibrium state is reached by having catches to move to a position that fits the requirements of the slope sensor. In other words, the bevel gear 221 will no longer engage with the bevel gear 202 of the gear assembly 20 (shown in FIG. 18(a)) when the equilibrium state is reached.

Figure 22:
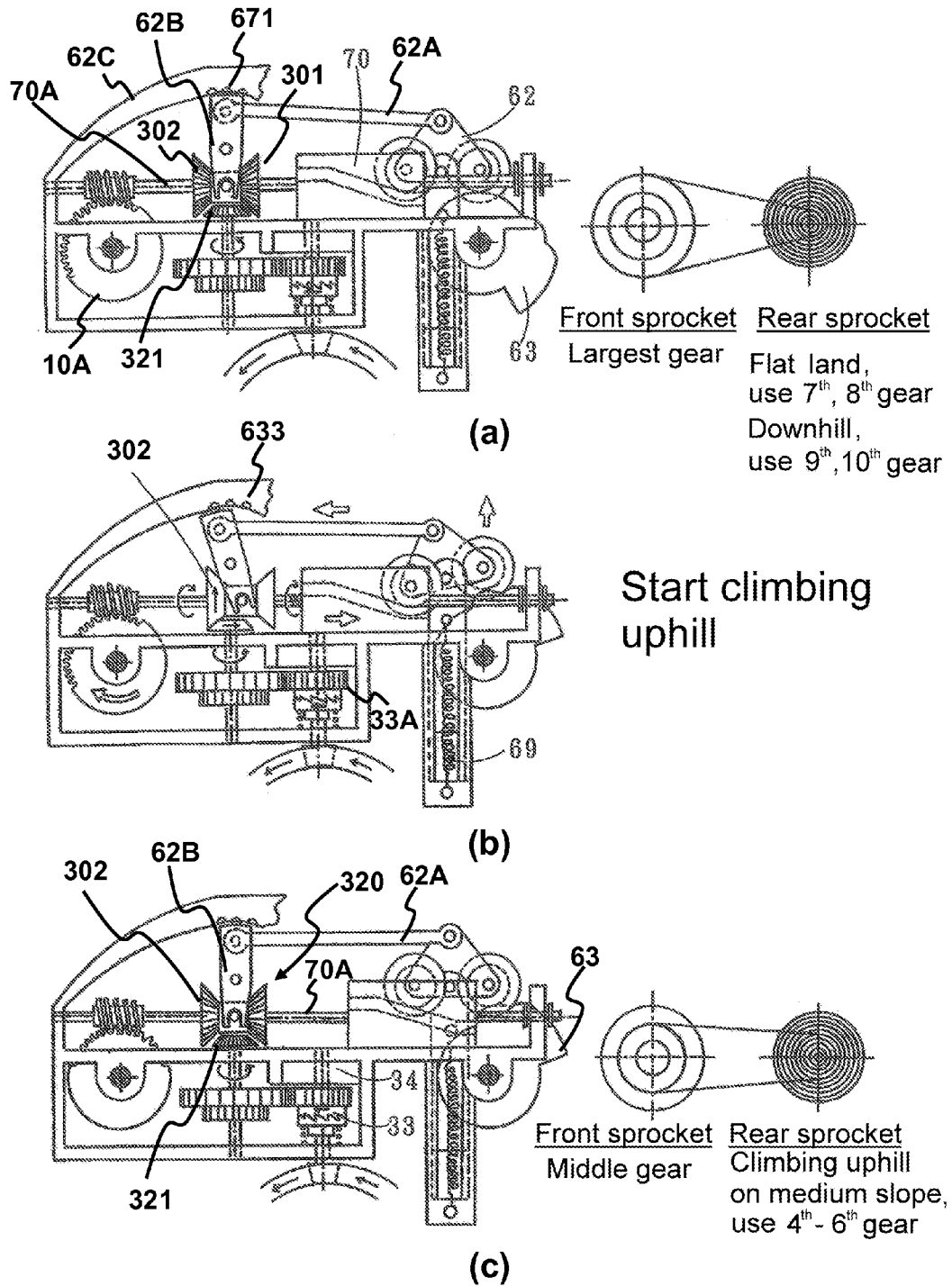
FIG. 22 depicts how a front and rear gearshift driving mechanism of an automatic transmission device works according to one embodiment of the present invention.
Figure 22:
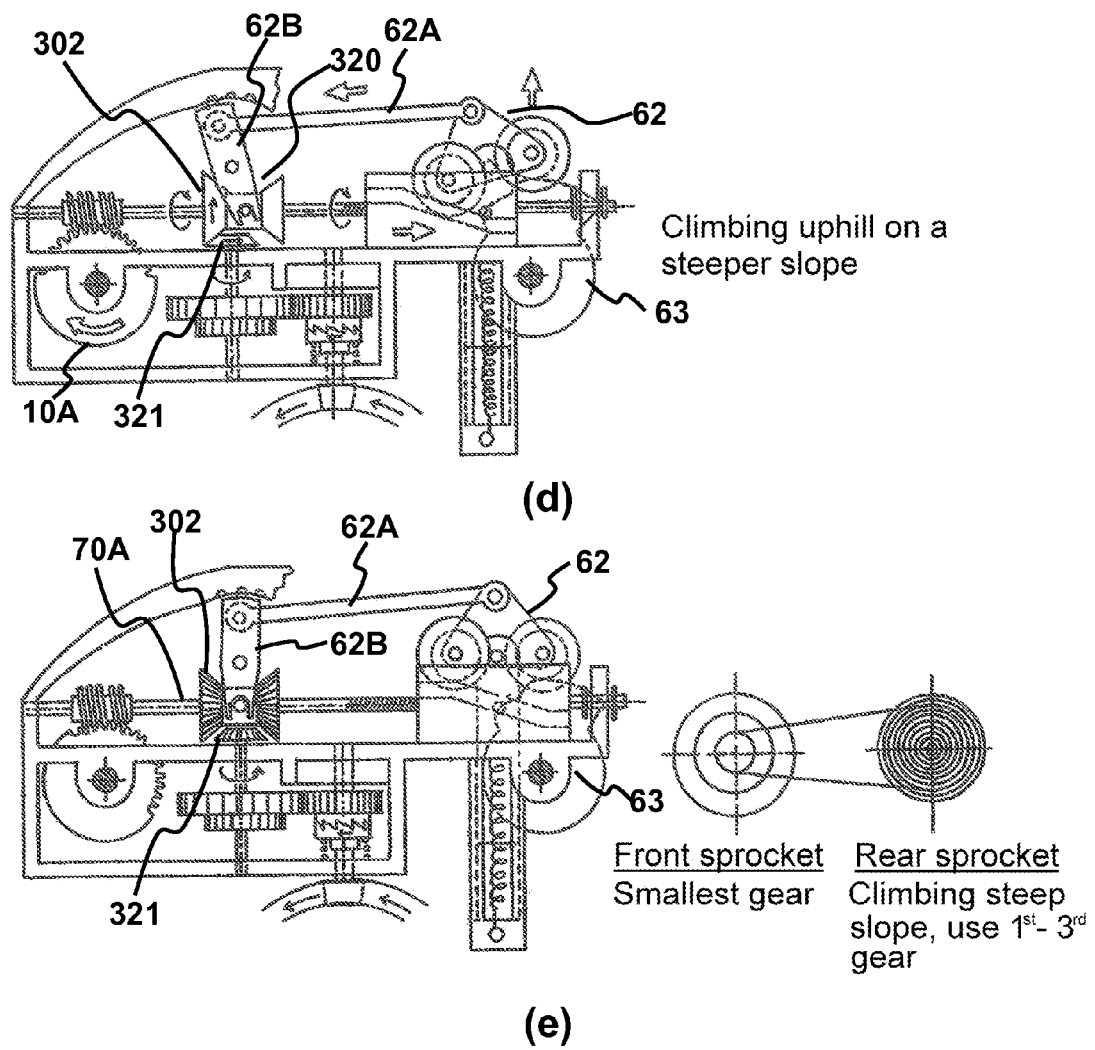

FIG. 22 depicts how a front and rear gearshift driving mechanism of an automatic transmission device works according to one embodiment of the present invention. The front sprocket assembly has three sizes of sprockets which are large, medium and small sprockets (not shown in FIG. 22) while the rear sprocket has speed levels of 1 to 10 (1 for the largest hub diameter; 10 for the smallest hub diameter) (not shown in FIG. 22). The front/rear gearshift driving mechanisms includes a ramp 70 which is connected with a forward/reverse directional change gear assembly 320 and a balancing swing weight 62. The balancing swing weight 62 is interconnected with cam 63. A horizontal arm 62A is pivotally connected with the vertical arm 62B. The spring 69 is mainly used to provide a force to pull the balancing swing weight 62 toward itself so that the left wheel of the balancing swing weight 62 keeps pressing against the ramp 70 and the right wheel of the balancing swing weight 62 keeps pressing against the cam 63. A positioning ball 671 at the top end of the vertical arm 62B snaps onto one of the depressions 633 such that the bevel gear 321 can leave or engage with the bevel gear 301 or the bevel gear 302 without bouncing back and forth unnecessarily between the bevel gear 301 and the bevel gear 302. This is because the positioning ball 671 secures the position of the vertical arm 62B by fitting itself into one of the depressions 633 rather than having any unnecessary swing motion.

In FIG. 22(a), when the bicycle is at a horizontal position, the front sprocket assembly shifts to the large sprocket (not shown in this figure) while the rear sprocket assembly uses the speed level of 7 or 8. When the bicycle is going downhill, the front sprocket assembly stays with the large sprocket while the rear sprocket assembly may reach the speed level 9 or 10.

The anti-clockwise movement of the cam 63 will change the speed level of the rear sprocket assembly by increasing the hub diameter. Simultaneously, the upward movement of the balancing swing weight 62 pushes the horizontal arm 62A towards the direction of the front sprocket assembly. The movement of the horizontal arm 62A pivotally pulls the vertical arm 62B towards the same direction as the movement of the horizontal arm 62A and interlocks the vertical arm 62B with the front chamfer of the extension 62C through the engagement of the positioning ball 671 with the depression 633. The rotation of the rotating rod 70A also turns the front sprocket assembly to move in clockwise direction so as to switch large sprocket 14 into medium sprocket 15 (not shown in this figure) or even small sprocket 16 (not shown in this figure) if the slope is steep enough.

After the bicycle has climbed uphill for a short period of time, the front/rear gearshift driving mechanisms returns to the normal state at the horizontal position since the front sprocket assembly has changed into the appropriate sprocket while the rear sprocket assembly also has switched to a larger hub diameter (i.e. smaller speed level number between 4-6) so that the torque is restored. In FIG. 22(c), when the steepness of the slope remains constant, the rotating rod 70A drives the motion of the ramp 70 through the nut 58A (nut 58A is shown in FIG. 3). The motion of the ramp 70 acts as a feedback action, it finally makes the rotating rod 70A cease to rotate, so that so that the bevel gear 302 detaches from the bevel gear 321 of the gear assembly 320. Subsequently, the balancing swing weight 62, the horizontal arm 62A and the vertical arm 62B return to the normal position as those on a horizontal plane. But the cam 63 stays with the larger hub diameter (or smaller speed level number) as that at the beginning of the climbing in order to maintain sufficient mechanical force of the rear wheel to keep the bicycle steadily running uphill without additional input of the workload. In this example, the speed level of the rear sprocket assembly keeps around 4 to 6 while the front sprocket assembly switches to medium sprocket or smaller, depending on the steepness of the slope. Ratchet 33 and anti-reverse device 34 are part of an anti-reverse assembly. The function of the anti-reverse assembly is to avoid the reverse rotation of the pedal wheel when the torque is decreasing and/or the cyclist misses the step on the pedal. Detailed description of the anti-reverse assembly will be given in later paragraph.

Figure 27:
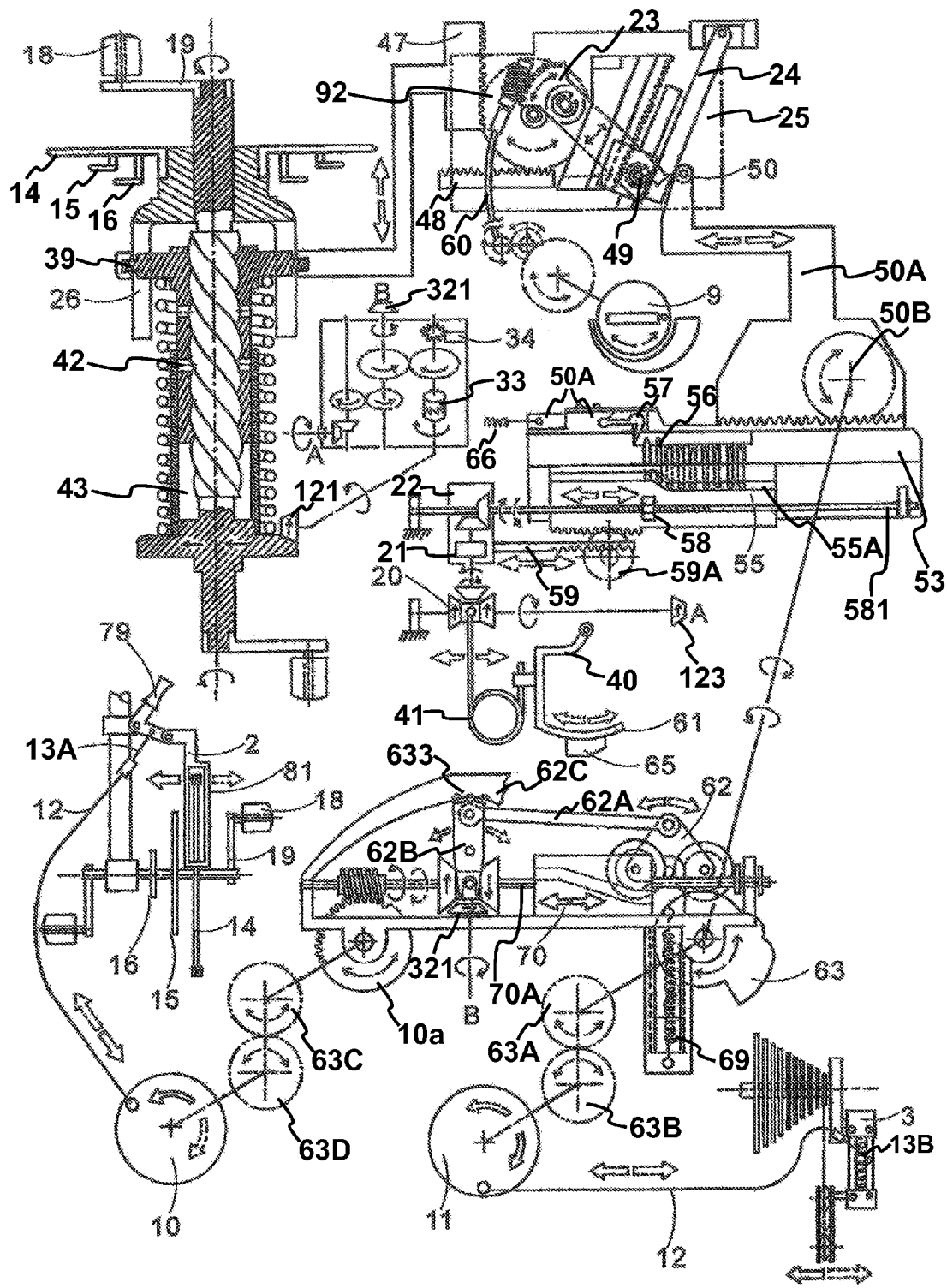
FIG. 27 depicts a schematic diagram illustrating how an automatic transmission device according to one embodiment of the present invention works.

In FIG. 22(d), when the bicycle is moving uphill, the cam 63 rotates clockwise and the right wheel of the balancing swing weight 62 will be lifted up so that the horizontal arm 62A will be pushed towards the vertical arm 62B. The vertical arm 62B acts like a lever to move the gear assembly 320 towards the extension 62C so that the bevel gear 302 engages with the bevel gear 321. Consequently, auxiliary power is transmitted from the bevel gear 321 to the bevel gear 302 and subsequently to other components through the rotating rod 70A in the following paths:

(a) one end of the rotating rod 70A drives the front gearshift gear 10A and thus the relay gears 63C and 63D so that the front gearshift controlling disc 10 rotates to move the front derailleur 2 through the wire 13A (please see FIG. 27);

(b) the other end of the rotating rod 70A drives the ramp 70 to provide feedback so that the ramp 70 moves towards the balancing swing weight 62 to raise the left wheel of the balancing swing weight 62. Subsequently, both the left wheel and the right wheel of the balancing swing weight 62 come to a rest in the same level. This makes the horizontal arm 62A return to its initial position and the vertical arm 62B also return to its initial vertical position. The bevel gear 302 of the gear assembly 320 is no longer in contact with the bevel gear 321 so that the rotating rod 70A stops rotating and other components of the front gearshift driving mechanism will also stop moving. Different components of the front gearshift driving mechanism will remain stationary until the cam 63 moves again.

The cam 63 is controlled by the receiving gear (not shown) only and remains stationary unless it is driven by the receiving gear.

After the bicycle has climbed uphill along the relatively steeper slope for certain period of time, the front/rear gearshift driving mechanisms returns to the state like that at the horizontal position since the front sprocket assembly has changed into the small sprocket while the rear sprocket assembly also has switched to the largest hub diameter (i.e. the speed level between 1-3). In FIG. 22(e), when the steepness of the relatively steeper slope remains constant, the feedback action will make the rotating rod 70A cease to rotate so that the bevel gear 302 detaches from the bevel gear 321 of the gear assembly 320. Subsequently, the balancing swing weight 62, the horizontal arm 62A and the vertical arm 62B are not in contact and return to the normal position as those on a horizontal plane. But the cam 63 turns to the largest hub diameter (or the smallest speed level number) in order to maintain sufficient mechanical force of the rear wheel to keep the bicycle steadily running uphill without additional input of the workload. In this example, the speed level of the rear sprocket assembly keeps around 1 to 3 while the front sprocket assembly switches to the small sprocket.

Figure 23:
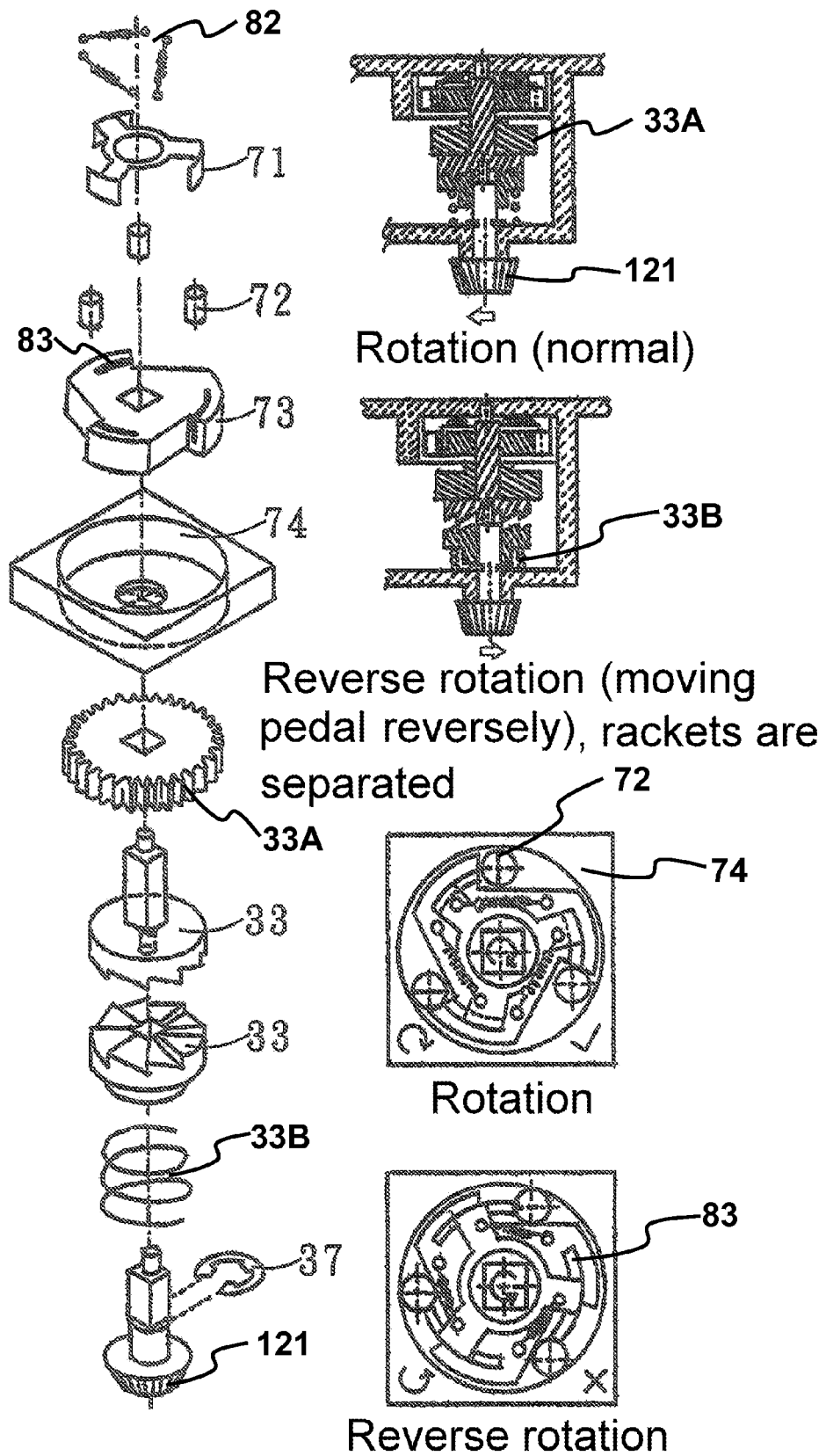
FIG. 23 depicts an exploded view of the anti-reverse device of an automatic transmission device according to one embodiment of the present invention and illustrates how the anti-reverse device works.

FIG. 23 depicts an exploded view of the anti-reverse device of an automatic transmission device according to one embodiment of the present invention and illustrates how the anti-reverse device works. The anti-reverse assembly of the present invention is to avoid reverse rotation of the pedal wheel due to sudden loss of torque or the missing of the cyclist's step on the pedal. The anti-reverse assembly includes a roller push arm 71, one or more rollers 72, a respective rotatable base 73, a fixed base 74, a gear 33A, a ratchet 33, a spring 33B and a C-shaped flexible latch 37. When the pedal rotates in a forward direction (or called pedaling), the ratchet 33 rotates accordingly in one direction (e.g. clockwise direction) while the roller push arm 71 and the respective rotatable base 73 rotates in same direction (e.g. clockwise direction). If the pedal rotates reversely (or called backpedaling), the ratchet 33 will rotate in the same direction as the pedal which is contrary to the forward movement of the bicycle. However, the lower part of the ratchet 33 releases from the upper part of the ratchet 33 to prevent further driving of the gear 33A due to the reverse rotation of the pedal. With this feature, the gear assembly 320 cannot be driven by the reverse rotation of the pedal which is very common when the bicycle is going uphill and the cyclist misses the pedal.

The rotatable base 73 has three receiving slots 83, each of which receives one roller 72 and the roller 72 is free to move in the receiving slot 83. The roller push arm 71 is under the resilient action by the springs 82 and provides a force to keep the rollers 72 away from the receiving slots 83.

There are two situations as shown in FIG. 23: one is rotation and the other one is reverse rotation. For rotation, the bevel gear 121 rotates in clockwise direction, the rollers 72 move towards the receiving slots 83 and press the roller push arm 71 into the rotatable base 73. When the rotation of the bevel gear 121 stops, the roller push arm 71 is pushed away from the rotatable base 73 by the springs 82 so that the roller push arm 71 leaves the receiving slots 83.

For reverse rotation, the rollers 72 move away from the receiving slots 83 and are pressed into the narrower end of the gap between the rotatable base 73 and the fixed base 74. The more the rollers 72 move into the narrow end of the gap between the rotatable base 73 and the fixed base 74, the more difficult it is for the rotatable base 73 to rotate in the reverse direction because the rollers get more stuck between the rotatable base 73 and the fixed base 74. Consequently, it remains the lower half of the ratchet 33 which is communicatively connected to the bevel gear 121 (also shown in FIG. 22 and FIG. 27) to follow the reverse rotation of the bevel gear 121. However, the upper half of the ratchet 33 and the gear 33A will stop rotating in reverse direction because the reverse rotation of the rotatable base 73 is blocked. This achieves the function of preventing the gear 33A from rotating in a reverse direction.

Figure 24:
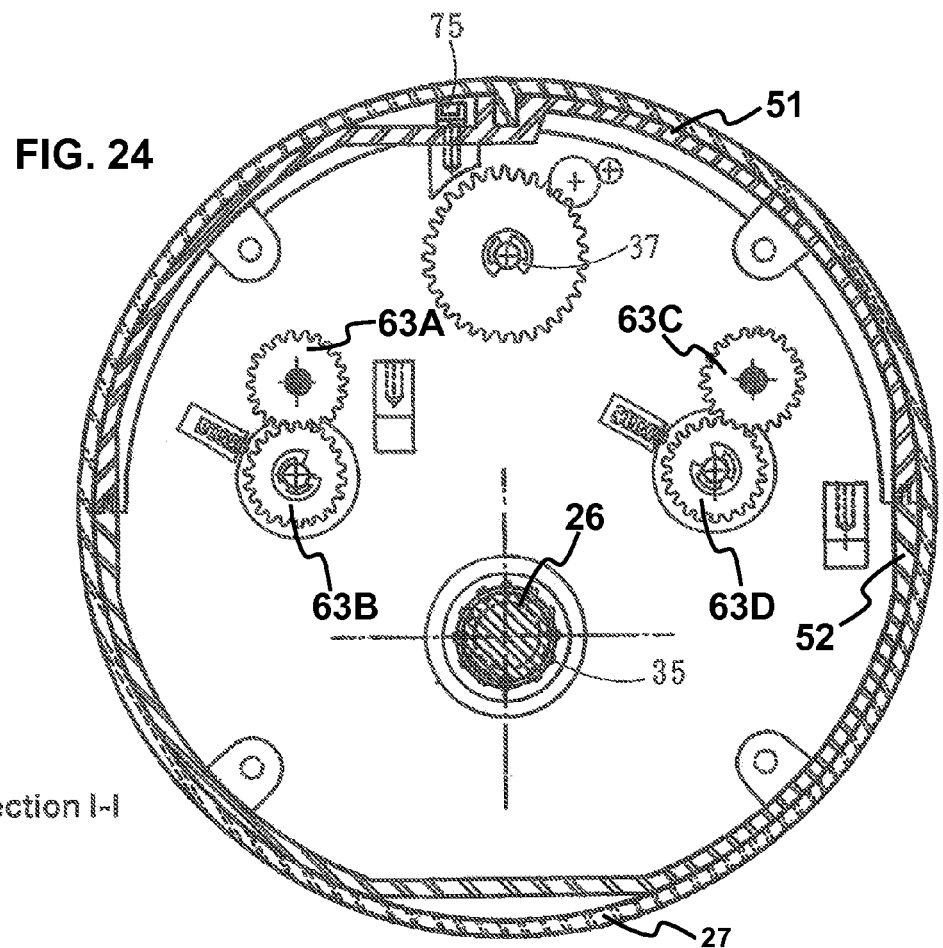
FIG. 24 depicts a cross-sectional view of the automatic transmission device along the I-I axis in FIG. 3.

FIG. 24 depicts a cross-sectional view of the automatic transmission device along the I-I axis in FIG. 3. The torque sensor 26 is supported by the ball bearings 35 on the panel of the housing 52. The screw 75 secures the cover 51 onto the housing 52. The C-shaped flexible latch 37 positions a gear a particular position along the axis around which the gear rotates.

Figure 25:
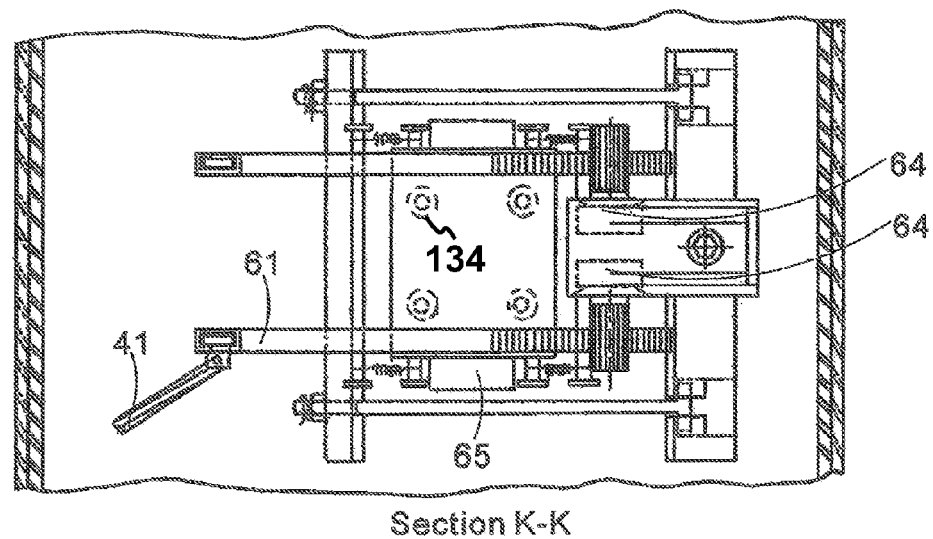
FIG. 25 depicts a cross-sectional view of the automatic transmission device along the K-K axis in FIG. 20.

FIG. 25 depicts a cross-sectional view of the automatic transmission device along the K-K axis in FIG. 20. There are two dampers 64 to buffer the swing motion of the weight crane 61. The weight crane 61 moves the towbar 41 when the weight 65 on the weight crane 61 makes the weight crane 61 swing. A number of indentations 134 (also see FIG. 5) are provided to accommodate the weight 65 so that the weight 65 is re-secured onto the weight crane 61 with its protrusions fitted in these indentations 134 while the weight 65 has been temporarily dropped off from its seat under a heavy impact.

Figure 26:
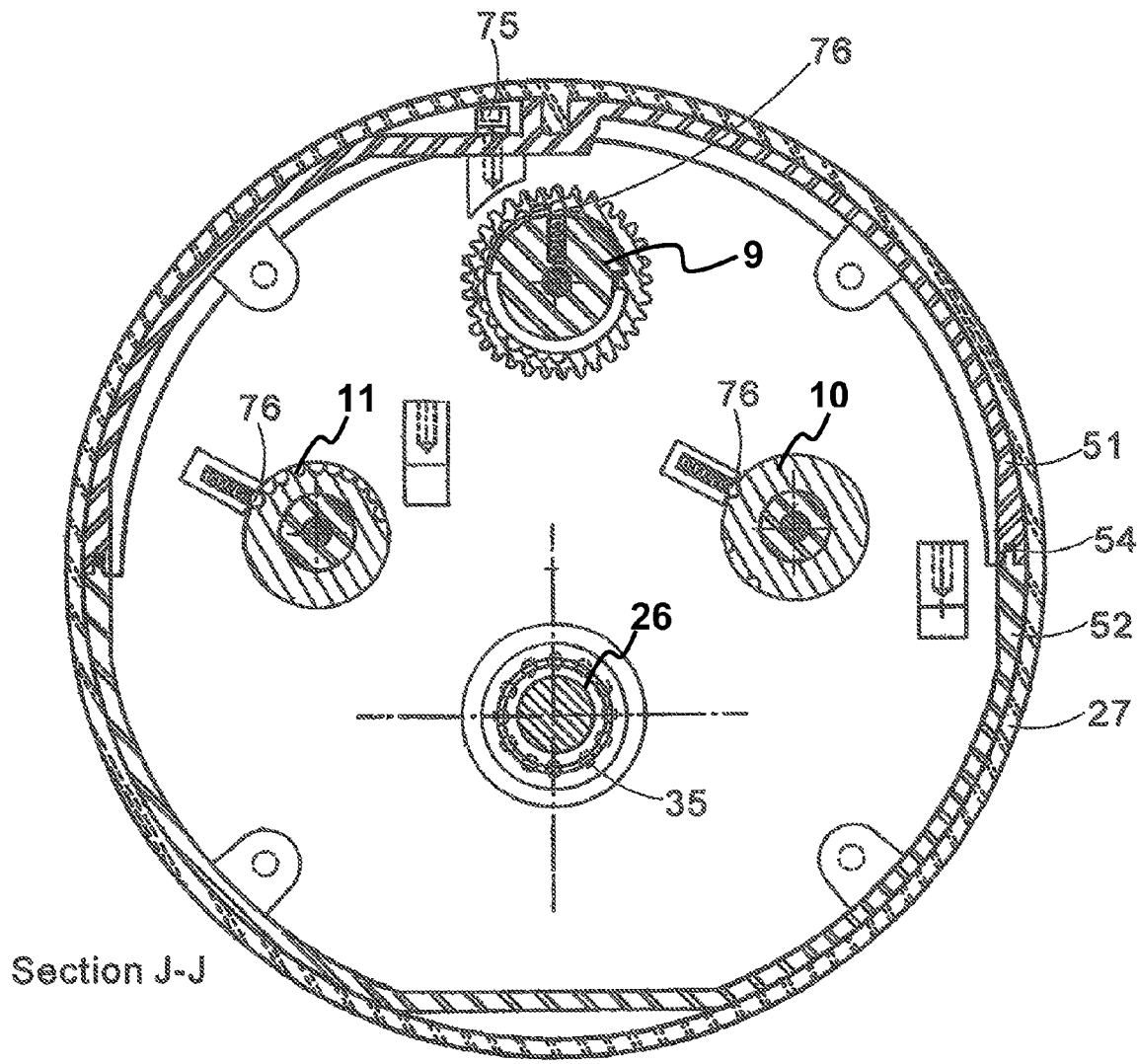
FIG. 26 depicts a cross-sectional view of the automatic transmission device along the J-J axis in FIG. 3.

FIG. 26 depicts a cross-sectional view of the automatic transmission device along the J-J axis in FIG. 3. There are ball bearings 35 around the axle of the torque sensor 26. There are positioning balls 76 around each of the rotatable components such as the body strength selector 9, the front gearshift controlling disc 10 and the rear gearshift controlling disc 11.

There are a number of slots around these rotatable components to receive the positioning balls 76 so that the positioning balls 76 maintain the orientation of each rotatable component with a spring to press the positioning balls 76 against each rotatable components. The housing 52 is covered by a cover 51 with dust battens 54 between them. The cover 51 is further secured onto the housing 52 by a plurality of screws 75.

FIG. 27 depicts a schematic diagram illustrating how an automatic transmission device according to one embodiment of the present invention works. The torque sensor 26 detects the torque transferred from the pedals 18 to the axle through cranks 19. Depending on the magnitude of the torque detected, the torque sensor 26 drives the movement of the pushing rack 47 to push the receiving shaft 50.

The body strength selector 9 varies the orientation of the push arm 23 through a flexible draft shaft 60. The push arm 23 pushes on various points along the swing arm 24 according to the orientation of the push arm 23. If the push arm 23 pushes at a point closer to the pivot of the swing arm 24, the swing amplitude of the swing arm 24 will be less than the case when the push arm 23 pushes at a point further away from the pivot of the swing arm 24. The larger the swing amplitude is provided by the swing arm 24 under a given torque detected by the torque sensor, the greater the movement of the receiving shaft 50.

The receiving shaft 50 moves the rack block 50A, then actuates the receiving gear 50B, eventually controls the rear gearshift controlling disc 11 to change gear by shifting the chain onto rear sprockets of different sizes through the rear derailleur 3. The rear derailleur 3 is operationally in connected to the rear gearshift controlling disc 11 through a wire 13B which is covered by a protective sheath 12. The receiving shaft 50 controls the rear gearshift controlling disc 11 through a cam 63. The cam 63 is in an irregular shape and has parts with varying radius from the centre thereof. When the bicycle is climbing uphill, the cam 63 will have its parts with larger radius engaged with the balancing swing weight 62. The balancing swing weight 62 will move up the ramp 70 from a lower position on the ramp 70. The rear gearshift controlling disc 11 is rotated to move the wire 13B and reduce the distance between an end of the rear derailleur 3 from the rear sprockets to allow the chain to engage with larger sprockets. With the larger rear sprockets, low gear has been automatically selected for the rear gear of the bicycle.

When the bicycle is moving downhill, the cam will have its parts with small radius engaged with the balancing swing weight 62. The balancing swing weight 62 will move down the ramp 70 from a higher position on the ramp 70. The rear gearshift controlling disc 11 is rotated to move the wire 13B and increase the distance between an end of the rear derailleur 3 from the rear sprockets to allow the chain to engage with smaller sprockets. With the smaller rear sprockets, high gear has been automatically selected for the rear gear of the bicycle.

The anti-reverse device 34 allows the rackets therein to rotate in clockwise direction only so that it prevents the pedal 18 and the crank 19 from suddenly rotating in a reverse direction when the force applied on the pedal 18 is reduced or vanishes suddenly, for example, if the user lifts his foot from the pedal 18 temporarily. When the rackets rotates in clockwise direction as driven by the torque sensor 26 as the torque is increasing, the gear 321 rotates in anti-clockwise direction to control the front gearshift controlling disc 10 to rotate in anti-clockwise direction. The front gearshift controlling disc 10 will retrieve the wire 13A which is linked to the front derailleur 2. The wire 13A will pull the front derailleur 2 to arrange the chain through a guide board 81 onto smaller front sprockets such as from the large front sprocket 14 to the medium front sprocket 15 or from the medium front sprocket 15 to the small front sprocket 16 to change the front gear to a higher gear.

When the torque detected by the torque sensor 26 decreases as the bicycle is going downhill or on a flat land, the front gearshift controlling disc 10 will rotate clockwise to release the wire 13A which is linked with the front derailleur 2 and the front derailleur 2 moves the chain through a guide board 81 onto larger front sprockets such as from the medium front sprocket 15 to the large front sprocket 14 or from the small front sprocket 16 to the medium front sprocket 15. Therefore, the front gear of the bicycle is changed to a lower gear. The front derailleur 2 is also controlled by a handle 79 independently. The handle 79 alone is capable of changing the front gear among various sizes of front sprockets by lifting and shifting the chain through the guide board 81. The handle 79 is mainly used to shift the guide board 81 to the position of the small sprocket 16, since there is more space available for rearranging the chain.

The gear-blocker 55 prevent the rear derailleur to change to a higher one when the bicycle is heading uphill as detected by the slope sensor of the weight 65 and the weight crane 61.

In one embodiment, the automatic transmission device 1 mainly responds to the action of a cyclist upon the pedals 18. Such action initiates a chain of reactions by various components in the automatic transmission device 1 in the following flow: pedal 18, crank 19, torque sensor 26, torque variation output ring 39, pushing rack 47, transfer gear 92, receiving rack 48, tackle 25, push arm 23, pushing shaft 49, swing arm 24, receiving shaft 50, rack block 50A, receiving gear 50B, cam 63, relay gear 63A, relay gear 63B, rear gearshift controlling disc 11, wire 13B, rear derailleur 3.

The cam 63 will trigger the front gearshift driving mechanism which consists of front gearshift gear 10A, relay gear 63C, relay gear 63D, front gearshift controlling disc 10, wire 13A, and front derailleur 2. The cam 63, the receiving gear 50B and the relay gear 63A are coaxial and rotate in the same direction. The cam 63 is driven by the receiving gear 50B rather than any other component in the front gearshift driving mechanism.

For the front gearshift driving mechanism, the cam 63 plays a key role and drives the whole mechanism. The whole front gearshift driving mechanism will remain stationary if the cam 63 does not move, except the bevel gear 321 which may keep rotating to provide auxiliary power to the front gearshift driving mechanism.

When the cam 63 rotates clockwise when the bicycle is moving uphill, the right wheel of the balancing swing weight 62 will be lifted up so that the horizontal arm 62A will be pushed towards the vertical arm 62B. The vertical arm 62B acts like a lever to move the gear assembly 320 towards the extension 62C so that the bevel gear 302 engages with the bevel gear 321. Consequently, auxiliary power is transmitted from the bevel gear 321 to the bevel gear 302 and subsequently to other components in two routes through the rotating rod 70A:

(a) one end of the rotating rod 70A drives the front gearshift gear 10A and thus the relay gears 63C and 63D so that the front gearshift controlling disc 10 rotates to move the front derailleur 2 through the wire 13A;

(b) the other end of the rotating rod 70A drives the ramp 70 to provide feedback so that the ramp 70 moves towards the balancing swing weight 62 to raise the left wheel of the balancing swing weight 62. Subsequently, both the left wheel and the right wheel of the balancing swing weight 62 come to a rest in the same level. This makes the horizontal arm 62A return to its initial position and the vertical arm 62B also return to its initial vertical position. The bevel gear 302 of the gear assembly 320 is no longer in contact with the bevel gear 321 so that the rotating rod 70A stops rotating and other components of the front gearshift driving mechanism will also stop moving. Different components of the front gearshift driving mechanism will remain stationary until the cam 63 moves again.

The cam 63 is controlled by the receiving gear 50B only and remains stationary unless it is driven by receiving gear 50B.

The bevel gear 121 is driven by the torque sensor 26. The bevel gear 121 is mainly used to provide auxiliary power for tasks such as control and feedback. The rotation of the bevel gear 121 will be received and processed by the anti-reverse device 34 so that the bevel gear 123 (point A as shown in FIG. 27) will rotate and move the gear assembly 20 under the control of the slope sensor. For example, when the bicycle goes uphill, the slope sensor makes the bevel gear 202 engage with the bevel gear 221 by moving the towbar 41 so that the bevel gear 222 is driven to move the rotating rod 581 and the nut 58. Consequently, the gear-blocker 55 moves away from the gear assembly 20 and the feedback gear 59A is rotated by the rack of the gear-blocker 55 so that the sliding rod 59 moves away from the gear assembly 20 as well. As the sliding rod 59 and the sliding block 22 are integrated together, the sliding block 22 will move away from the gear assembly 20 when the sliding rod 59 move away from the gear assembly 20. Consequently, the bevel gear 221 no longer engages with the bevel gear 202. The system returns to a stationary state and this state of equilibrium will be maintained until the slope sensor is triggered.

The bevel gear 321 of the anti-reverse device 34 (point B as shown in FIG. 27) provides an auxiliary power to the front gearshift driving mechanism and the operation of the front gearshift driving mechanism can be found above.

Figure 21:
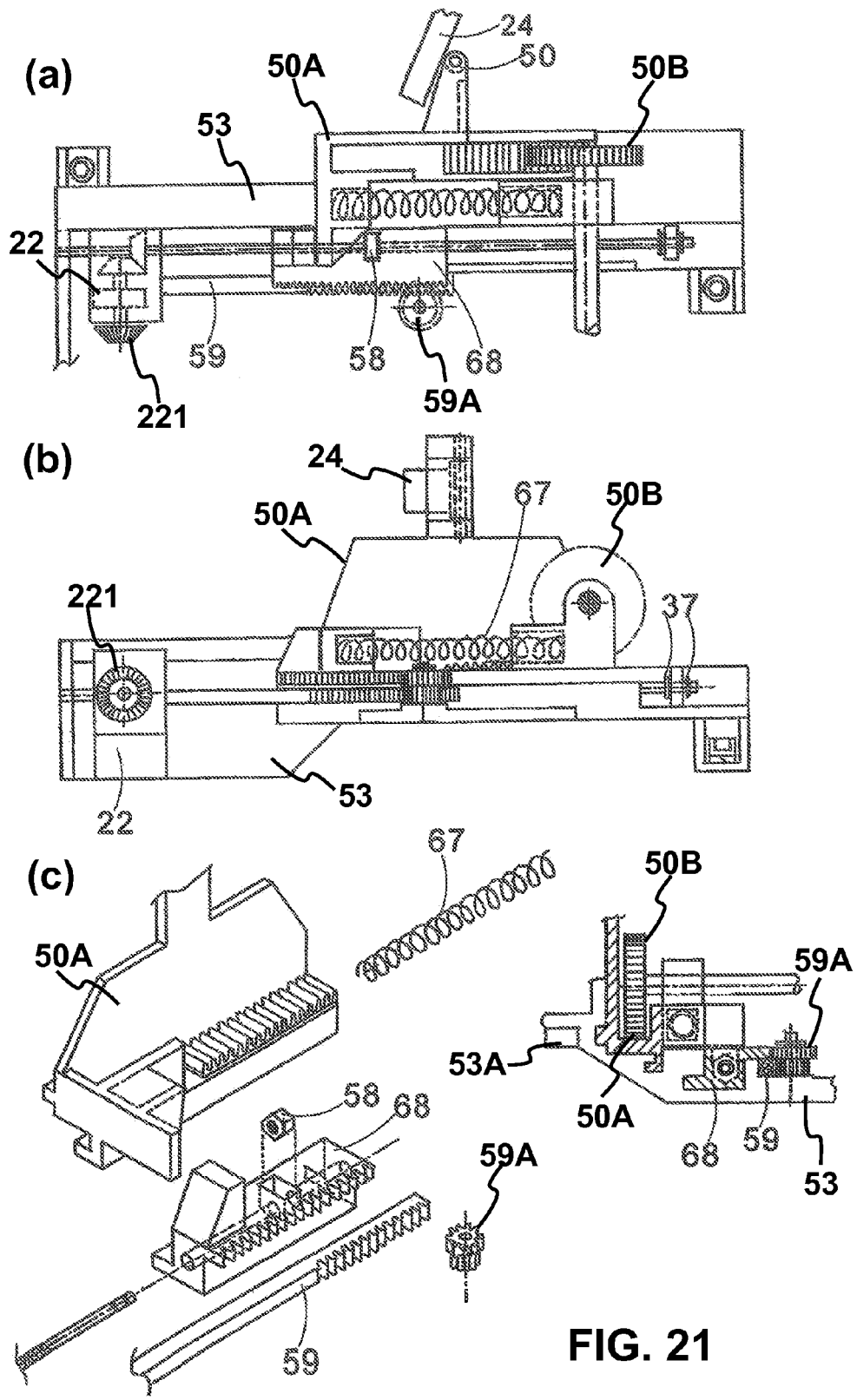
FIG. 21(a) depicts a top view of the gear-pusher of an automatic transmission device according to one embodiment of the present invention.
FIG. 21(b) depicts a side view of the gear-pusher of an automatic transmission device according to one embodiment of the present invention.
FIG. 21(c) depicts an exploded view of the gear-pusher of an automatic transmission device according to one embodiment of the present invention.

The receiving gear 50B is driven by the rack block 50A. There are two different forces which can drive the rack block 50A: One is the main power provided by the torque sensor 26 as well as the movement of the swing arm 24 and the other one is the auxiliary power provided by the rotating rod 581 and nut 58 from the gear assembly 20 so that the rack block 50A is driven by the gear pusher 68 as shown in FIG. 21.

The extension 62C is a part of the frame 53. There are three depressions 633 at the bottom of the extension 62C so that the positioning ball 671 at one end of the vertical arm 62B will fit into one of the three depressions 633 and secure the vertical arm 62B in an appropriate position stably.

Figure 28:
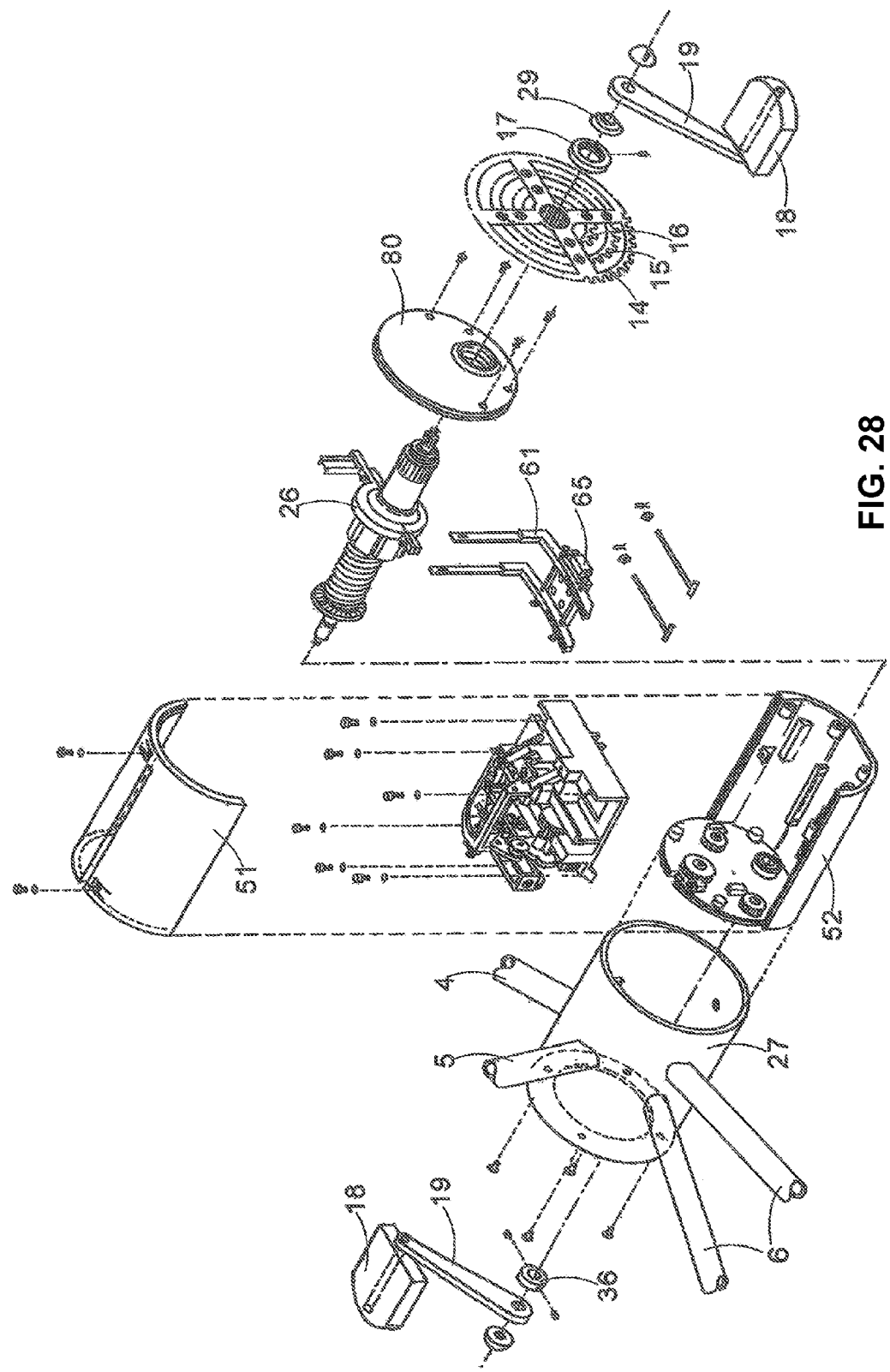
FIG. 28 depicts an exploded view of an automatic transmission device according to one embodiment of the present invention.

FIG. 28 depicts an exploded view of an automatic transmission device according to one embodiment of the present invention. The frame 27 is integrated with the seat tube 5, the down tube 4 and the chain stay 6. The housing 52 will hold various components of the automatic transmission device 1 such as the torque sensor 26, the weight crane 61 and the weight 65. The housing 52 has a cover 51 fitted thereon and they formed a cylinder-shape casing with one end showing the panel 108 of the automatic transmission device 1 and the other end closed by a front cover 80. The frame 27 has a guide 106 which is fitted with the slot 105 of the cover 51 when the housing 52 is installed into the frame 27. The guide 106 secures the housing 52 inside the frame 27 so that the guide 106 prevents any rotational movement of the housing 52 relative to the frame when the guide 106 engages with the slot 105 on the cover 51. Each pedal 18 is arranged on the crank 19 and each crank 19 is arranged on the torque sensor 26. Sprockets of various sizes 14, 15, 16 have their centres fitted through the torque sensor 26. The torque sensor 26 is protected from any foreign materials like dust and any external interference by being shielded by the housing 52 sealed with the front cover 80. There are the dust cover 29 and the retaining ring 17 between an opening on the front cover 80 and the portion of the torque sensor 26 which is exposed outside the housing 52 through front cover 80. The dust cover 29 and the retaining ring 17 also secures the sprockets and the output shaft 31 on the torque sensor 26 on one end of the torque sensor 26 and the snap ring 36 secures input shaft 32 on the other end of the torque sensor 26.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes exemplary embodiments of the invention, these descriptions should not be viewed in a limiting sense. Rather, there are several variations and modifications which may be made without departing from the scope of the present invention as defined in the appended claims.

What is claimed is:

1. An automatic transmission device for use in a bicycle comprising:
    a housing;
    a torque sensor configured to detect a torque generated by a pedal on the axle of the bicycle;
    a body strength selector having a plurality of settings configured to vary the rate of change of gear;
    a slope sensor disposed within the housing, the slope sensor having a weight at a lower end thereof to maintain the position thereof corresponding to the inclination of the housing changing according to the slope on which the housing is disposed on;
    a front and rear gearshift driving mechanism configured to control a front sprocket assembly and a rear sprocket assembly;
    the torque sensor is configured to displace a torque variation output ring to control the movement of a tackle;
    the tackle includes a push arm configured to arrange a pushing shaft at a plurality of orientations controlling the magnitude of the moment of a swing arm such that a receiving shaft is configured to change gear at various rates by rotating a disc for controlling a front sprocket assembly and a disc for controlling a rear sprocket assembly respectively;
    the slope sensor is configured to such that a catch prevents a rack block from performing any change of gear when the slope value is positive.

2. The automatic transmission device for use in a bicycle according to claim 1,
    further comprising:
    a gear-pusher actuating the rack block directly and independently.

3. The automatic transmission device for use in a bicycle according to claim 1,
    wherein:
    the front and rear gearshift driving mechanism is configured to drive the rotation of the front sprocket assembly through a weight, a gear assembly, a front gearshift gear, one or more relay gears, and a front gearshift controlling disc; and to drive the rotation of the rear sprocket assembly through a rack block, a receiving gear, one or more relay gears and the front gearshift controlling disc.

4. The automatic transmission device for use in a bicycle according to claim 1, further comprising:
an air-damping chamber is arranged within the torque sensor such that the motion of the axle is dampened when the torque on the pedal is reduced to zero.

5. The automatic transmission device for use in a bicycle according to claim 1, further comprising:
an upper gear fixing block is disposed at the upper end of the pushing shaft and a lower gear fixing block is disposed at the lower end of the pushing shaft such that the displacement of the pushing shaft is confined by the upper gear fixing block and the lower gear fixing block.

6. The automatic transmission device for use in a bicycle according to claim 1,
a handle is configured to hold a chain such that a guide board is displaced to the position of the smallest sprocket to provide more space for rearranging the chain.

7. The automatic transmission device for use in a bicycle according to claim 3, further comprising:
the weight attached to a weight crane of the slope sensor.

8. The automatic transmission device for use in a bicycle according to claim 7, further comprising:
a release separating the lower part of the weight crane from the upper part of the weight crane.

9. The automatic transmission device for use in a bicycle according to claim 7, further comprising:
one or more indentations configured to hold the weight in an appropriate position.

10. The automatic transmission device for use in a bicycle according to claim 1, further comprising:
a cover to seal the housing with dust batten such that entry of foreign material into the housing is prevented.

11. The automatic transmission device for use in a bicycle according to claim 10, wherein:
the housing is fitted into a frame together with the cover such that a slot on the cover engages with a guide on the inner wall of the frame to secure the position of the housing in the frame.

12. The automatic transmission device for use in a bicycle according to claim 1, further comprising:
an anti-reverse device is configured to prevent the reverse rotation of the pedal when the torque applied on the axle diminishes.

13. The automatic transmission device for use in a bicycle according to claim 3, wherein:
the cam is configured to have its orientation balanced by a balancing swing weight such that the cam has a plurality of portions with different radius fitted with the balancing swing weight.

14. The automatic transmission device for use in a bicycle according to claim 13, wherein:
the balancing swing weight is arranged at a plurality of levels to fit with different portions of the cam by moving along a ramp; wherein the ramp, a horizontal arm and a vertical arm function together as a feedback mechanism.

15. The automatic transmission device for use in a bicycle according to claim 8, wherein:
the lower part of the weight crane is configured to be engaged with a damper such that the motion of the weight crane is provided with a damping effect.

16. The automatic transmission device for use in a bicycle according to claim 3, wherein:
the gear assembly is configured to have both a first bevel gear and a second bevel gear rotating in the same direction such that the first bevel gear and the second bevel gear engage with different ends of a third bevel gear respectively at different time to turn the third bevel gear in different directions.

17. The automatic transmission device for use in a bicycle according to claim 16, wherein:
the third bevel gear is connected to an inertia flywheel such that the inertia flywheel turns the third bevel gear for further rotation after the third bevel gear is no longer engaged with either the first bevel gear or the second bevel gear; wherein a feedback gear, a sliding rod and a sliding block function together as a feedback mechanism.

18. The automatic transmission device for use in a bicycle according to claim 1, wherein:
the torque sensor has a threaded portion screwing through a piston and a coil spring to sense the torque variation.

19. The automatic transmission device for use in a bicycle according to claim 18, wherein:
the piston has a plurality of holes through which a lubricant is applied onto the threaded portion to maintain the sensitivity of the torque sensor.

20. The automatic transmission device for use in a bicycle according to claim 19, wherein:
the external end of the piston has a corrugated surface to prevent the piston from sticking to other surface.

\* \* \* \* \*